US010110396B2

(12) United States Patent
Lee

(10) Patent No.: US 10,110,396 B2
(45) Date of Patent: *Oct. 23, 2018

(54) HOME APPLIANCE

(71) Applicant: LG ELECTRONICS INC., Seoul (KR)

(72) Inventor: Koonseok Lee, Seoul (KR)

(73) Assignee: LG Electronics Inc., Seoul (KR)

(*) Notice: Subject to any disclaimer, the term of this patent is extended or adjusted under 35 U.S.C. 154(b) by 242 days.

This patent is subject to a terminal disclaimer.

(21) Appl. No.: 14/731,515

(22) Filed: Jun. 5, 2015

(65) Prior Publication Data

US 2015/0358177 A1 Dec. 10, 2015

(30) Foreign Application Priority Data

Jun. 9, 2014 (KR) .................. 10-2014-0069656

(51) Int. Cl.
G06F 15/16 (2006.01)
H04L 12/28 (2006.01)
G05B 19/042 (2006.01)

(52) U.S. Cl.
CPC ........ *H04L 12/2834* (2013.01); *G05B 19/042* (2013.01); *H04L 12/2825* (2013.01); G05B 2219/2613 (2013.01)

(58) Field of Classification Search
CPC ............. H04L 12/2803; H04L 12/2807; H04L 12/2809; H04L 2012/285; H04L 12/2816; H04L 12/2818; H04L 12/2825; H04L 12/2827; H04L 12/2834; H04L 61/1511; H04L 65/1073; H04L 65/1069;
(Continued)

(56) References Cited

U.S. PATENT DOCUMENTS 8,150,963 B2 4/2012 Baek et al.
8,170,722 B1 * 5/2012 Elberbaum ........... H04L 12/281
455/151.1
(Continued)

FOREIGN PATENT DOCUMENTS

KR 10-0453968 10/2004
KR 2007-0048658 A 5/2007
(Continued)

OTHER PUBLICATIONS

Samsung Electronics Canada Inc. "Refrigerator user manual", dated Feb. 25, 2014.*
(Continued)

Primary Examiner — Kamal B Divecha
Assistant Examiner — Sandarva Khanal
(74) Attorney, Agent, or Firm — KED & Associates LLP

(57) ABSTRACT

A communication apparatus is disclosed. A home appliance includes a driving unit to drive a component of the home appliance, a controller configured to control the driving unit, and a communication unit to connect to an access point apparatus based on network related information, and the communication unit to connect to a server via the connected access point apparatus, wherein in response to a predetermined event, the communication unit to provide, to the server, a single data packet that includes a plurality of attribute data and values of the attribute data. Accordingly, it is possible to easily exchange data with the server.

20 Claims, 29 Drawing Sheets

(58) Field of Classification Search
CPC .......... G05B 19/042; G05B 2219/2613; Y02B 70/325; Y04S 20/228; Y04S 20/242
See application file for complete search history.

(56) References Cited

U.S. PATENT DOCUMENTS

| | | | |
|---|---|---|---|
| 9,874,911 B2* | 1/2018 | Rhoads | G06F 1/24 |
| 2002/0120502 A1* | 8/2002 | Sakaguchi | G06Q 30/02 705/14.49 |
| 2003/0140090 A1* | 7/2003 | Rezvani | H04L 41/22 709/203 |
| 2003/0198349 A1* | 10/2003 | Aizu | H04L 63/0492 380/277 |
| 2005/0160185 A1* | 7/2005 | Matsuura | F25D 29/00 710/1 |
| 2005/0234568 A1 | 10/2005 | Chung et al. | |
| 2006/0161275 A1* | 7/2006 | Plankl | H04L 12/2803 700/65 |
| 2008/0282182 A1 | 11/2008 | Oosaka | |
| 2010/0097628 A1* | 4/2010 | Masuda | G06F 3/1222 358/1.14 |
| 2011/0051823 A1 | 3/2011 | Imes | |
| 2011/0196547 A1* | 8/2011 | Park | G06Q 50/06 700/296 |
| 2012/0080944 A1 | 4/2012 | Recker et al. | |
| 2012/0197455 A1 | 8/2012 | Lee et al. | |
| 2012/0219008 A1 | 8/2012 | Lee et al. | |
| 2012/0299509 A1 | 11/2012 | Lee | |
| 2012/0303172 A1* | 11/2012 | Lee | H04L 12/2809 700/295 |
| 2013/0157637 A1* | 6/2013 | Bos | H04W 8/245 455/418 |
| 2013/0229947 A1* | 9/2013 | Vaswani | G01D 4/004 370/254 |
| 2013/0311610 A1 | 11/2013 | Kim | |
| 2014/0025795 A1 | 1/2014 | Fiennes | |
| 2014/0111539 A1 | 4/2014 | Allen et al. | |
| 2014/0148147 A1* | 5/2014 | Tak | H04M 1/72533 455/420 |
| 2014/0191856 A1 | 7/2014 | Cho et al. | |
| 2014/0215496 A1 | 7/2014 | Sexton | |
| 2014/0282991 A1* | 9/2014 | Watanabe | G06F 21/34 726/9 |
| 2014/0304126 A1* | 10/2014 | Kim | G06Q 10/087 705/28 |
| 2015/0039740 A1* | 2/2015 | Yamada | H04L 12/2807 709/223 |
| 2015/0048760 A1* | 2/2015 | Kwag | H05B 37/0272 315/297 |
| 2015/0073808 A1* | 3/2015 | Basir | G06F 3/0487 704/275 |
| 2015/0111539 A1* | 4/2015 | Shim | H04L 12/2803 455/411 |
| 2015/0319046 A1 | 11/2015 | Plummer et al. | |
| 2015/0350008 A1 | 12/2015 | Kim | |
| 2016/0026161 A1 | 1/2016 | Marutani et al. | |
| 2017/0163508 A1 | 6/2017 | Vaswani et al. | |

FOREIGN PATENT DOCUMENTS

| | | | | |
|---|---|---|---|---|
| KR | 10-0844259 | | 6/2008 | |
| KR | 10-0844259 | | 7/2008 | |
| KR | 2012-0088435 A | | 8/2012 | |
| WO | WO-2004107663 A1 * | | 12/2004 | ......... H04L 12/2803 |

OTHER PUBLICATIONS

Samsung Electronics Canada Inc. "Refrigerator user manual", dated Feb. 25, 2014. (Year: 2014).*
Hewlett Packard Enterprise Development LP, "Reset an HPE Synergy Frame Link Module to original factory settings", 2013. Retrieved online on May 25, 2018 from http://h17007.www1.hpe.com/docs/enterprise/servers/oneview3.0/cicf/en/content/s_settings-action-perform-factory-reset-ef-panel-atlas.html (Year: 2013).*
Korean Office Action dated Jul. 7, 2015 issued in Application No. 10-2014-0069656.
United States Office Action dated Apr. 10, 2017 issued in co-pending U.S. Appl. No. 14/731,539.
Korean Notice of Allowance for Application 10-2014-0069657 dated Dec. 30, 2015 (full Korean text).
U.S. Final Office Action dated Oct. 17, 2017 issued in co-pending U.S. Appl. No. 14/731,539.
U.S. Office Action issued in co-pending U.S. Appl. No. 14/731,506 dated Jul. 13, 2017.
U.S. Appl. No. 14/731,506, filed Jun. 5, 2015.
U.S. Appl. No. 14/731,539, filed Jun. 5, 2015.
U.S. Final Office Action dated Dec. 1, 2017 issued in co-pending U.S. Appl. No. 14/731,506.

* cited by examiner

HOME APPLIANCE

CROSS-REFERENCE TO RELATED APPLICATION(S)

This application claims priority under 35 U.S.C. § 119 to Korean Application No. 10-2014-0069656 filed in Korea on Jun. 9, 2014, whose entire disclosure is hereby incorporated by reference.

BACKGROUND

1. Field

The present invention relates to a home appliance, and, more particularly, to a home appliance capable of easily exchanging data with a server.

2. Background

Among home appliances provided in a building, a refrigerator stores food, a washing machine processes laundry, an air conditioner adjusts indoor temperature, and a cooker cooks food.

As various communication methods have been developed, a variety of research in hopes of increasing user convenience in terms of communication with a home appliance has been conducted.

The above references are incorporated by reference herein where appropriate for appropriate teachings of additional or alternative details, features and/or technical background.

SUMMARY OF THE INVENTION

Therefore, the present invention has been made in view of the above problems, and it is an object of the present invention to provide a home appliance capable of easily exchanging data with a server.

In accordance with an aspect of the present invention, the above and other objects can be accomplished by the provision of a home appliance including a driving unit to drive a component of the home appliance, a controller configured to control the driving unit, and a communication unit to connect to an access point apparatus based on network related information, and the communication unit to connect to a server via the connected access point apparatus, wherein in response to a predetermined event, the communication unit to provide, to the server, a single data packet that includes a plurality of attribute data and values of the attribute data.

In accordance with an aspect of the present invention, the above and other objects can be accomplished by the provision of an appliance including a driving unit to drive a component of the appliance, a controller configured to control the driving unit, a display to display a smart grid indicator, and a communication unit to connect the appliance to an access point based on network related information, and the communication unit to connect the appliance to an external device via the connected access point, wherein in response to an event at the appliance, the communication unit to provide, to the external device, a data packet that includes a plurality of attribute data and values of the attribute data.

BRIEF DESCRIPTION OF THE DRAWINGS

The embodiments will be described in detail with reference to the following drawings in which like reference numerals refer to like elements wherein:

FIG. 3b is a block diagram showing the internal configuration of an example of a communication unit of FIG. 3a;

FIGS. 6a to 6c are diagrams showing various examples of a display of the home appliance of FIG. 3a;

DETAILED DESCRIPTION

Exemplary embodiments of the present invention will be described with reference to the attached drawings.

The terms "module" and "unit" used in description of components are used herein to aid in the understanding of the components and thus should not be misconstrued as having specific meanings or roles. Accordingly, the terms "module" and "unit" may be used interchangeably.

Figure 1:
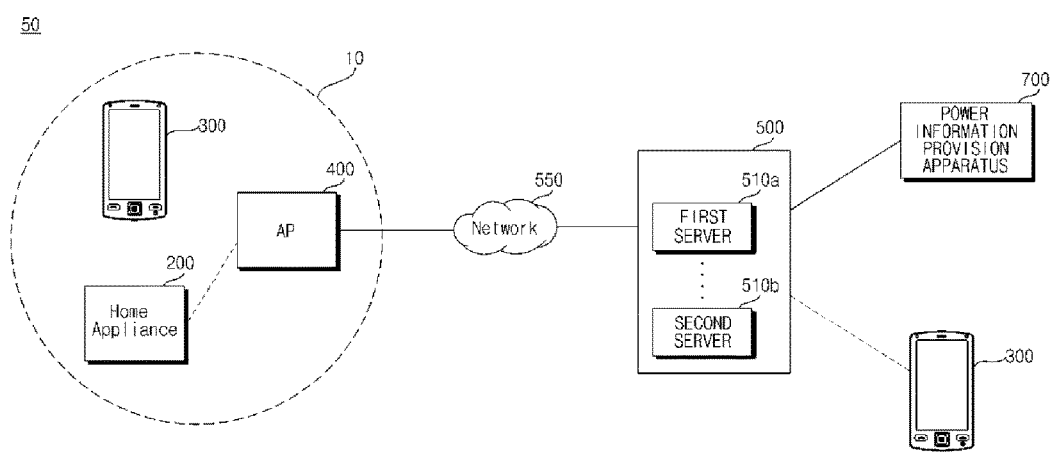
FIG. 1 is a diagram showing an example of a communication system according to an embodiment of the present invention.

FIG. 1 is a diagram showing an example of a communication system according to an embodiment of the present invention.

Referring to FIG. 1, the communication system 50 according to the embodiment of the present invention may include a home appliance 200, an access point (AP) apparatus 400, a server 500, a network 550 and a mobile terminal 300.

The home appliance 200 is an electric device for a user and includes a refrigerator (200a of FIG. 2), a washing machine (200b of FIG. 2), an air conditioner (200c of FIG. 2), a cooker (200d of FIG. 2) and a cleaner (200e of FIG. 2), for example.

The home appliance 200 includes a communication unit (not shown) and may exchange data with electric devices in an internal network 10 or electric devices connectable over an external network 550. For data exchange, the communication unit (not shown) may exchange data with the AP apparatus 400 by wire or wirelessly.

The AP apparatus 400 may provide the internal network 10 and, more particularly, a wireless network to adjacent electric devices.

The AP apparatus 400 may allocate radio channels according to a predetermined communication method to the electric devices in the internal network 10 and perform wireless data communication via the channels. Here, the predetermined communication method may be Wi-Fi communication.

At this time, the mobile terminal 300 located in the internal network 10 is connected to the home appliance 200 via the AP apparatus 400, thereby performing monitoring and remote control of the home appliance 200.

The AP apparatus 400 may perform data communication with an external electric device via the external network 550 in addition to the internal network 10.

For example, the AP apparatus 400 may perform wireless data communication with the externally located mobile terminal 300 via the external network 550.

At this time, the mobile terminal 300 located in the external network 550 is connected to the home appliance 200 via the external network 550 and the AP apparatus 400, thereby performing monitoring, remote control, smart diagnosis, etc. of the home appliance.

As another example, the AP apparatus 400 may perform wireless data communication with the externally located server via the external network 550.

The server 500 may store firmware information and operation information (course information) of the home appliance 200 and register product information of the home appliance. For example, the server 500 may be operated by a manufacturer or vendor of the home appliance 200. As another example, the server 500 may be operated by a public application store operator.

The home appliance 200 according to the embodiment of the present invention includes a driving unit, a controller for controlling the driving unit, and a communication unit connected to an AP apparatus using network related information and connected to a server via the connected AP apparatus. The communication unit exchanges a single data packet including a plurality of attribute data and values of the attribute data with the server when a predetermined event occurs.

The plurality of attribute data and values of the attribute data are not transmitted via a plurality of data packets but are transmitted via a single data packet, such that the server 500 confirms data per event. Accordingly, the home appliance can easily exchange data with the server.

For network setup, the home appliance transmits network setup related information to the AP apparatus 400, receives network related information from the AP apparatus 400, accesses the AP apparatus after receiving the network related information, and transmits product related information after accessing the AP apparatus 400, for product registration with the server 500. Thus, the home appliance can conveniently perform product registration with the server 500.

The home appliance 200 stores the received network related information such that the network related information may be used upon re-accessing the AP apparatus.

A user may distinguishably and immediately recognize accessing of the AP apparatus 400 and accessing of the server via a display.

The network related information is deleted in a first reset mode and the product related information of the product registered with the server 500 and the network related information are deleted in a second reset mode, such that the home appliance performs product re-registration with the server 500.

A smart grid operation may become possible based on Demand Response (DR) signal reception and thus power consumption can be reduced.

Indicators corresponding to various modes of the home appliance 200 operate, thereby increasing user convenience.

Figure 2A:
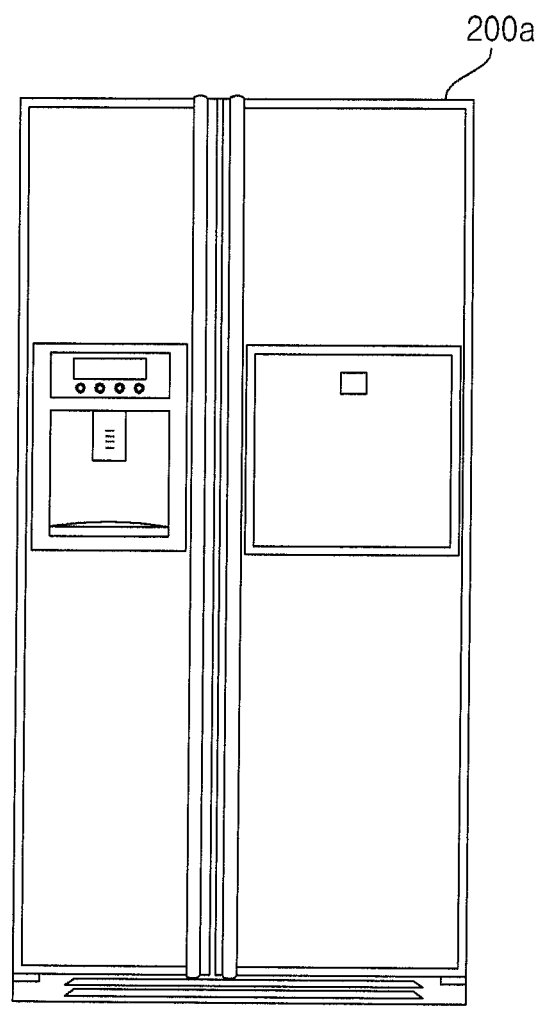
FIGS. 2a to 2e are diagrams illustrating various examples of a home appliance.
Figure 2B:
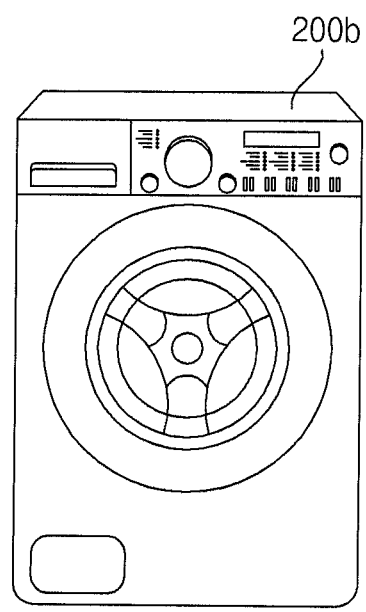
Figure 2C:
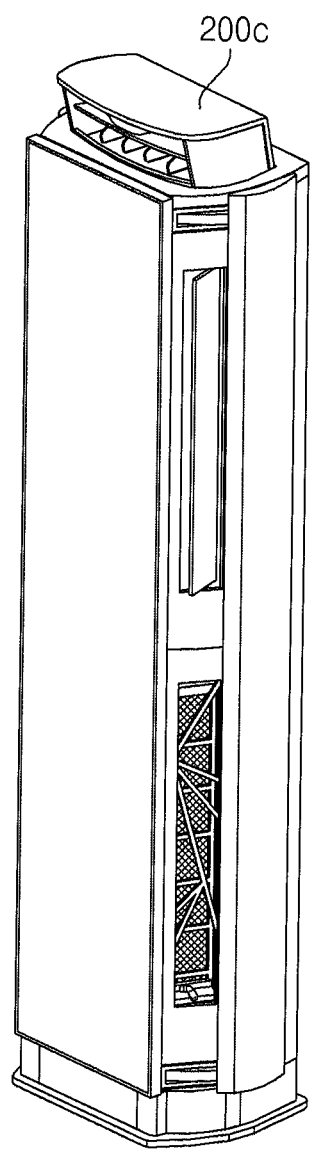
Figure 2D:
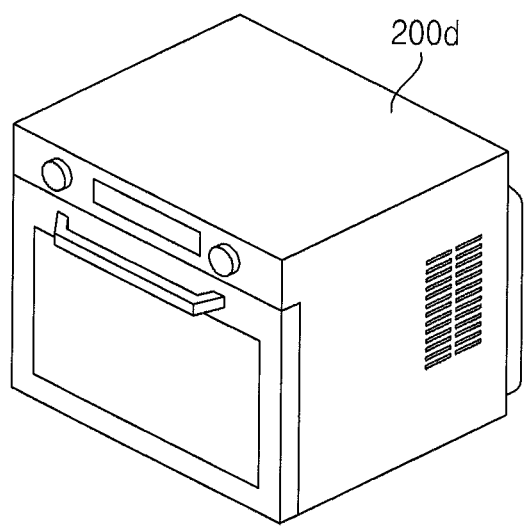
Figure 2E:
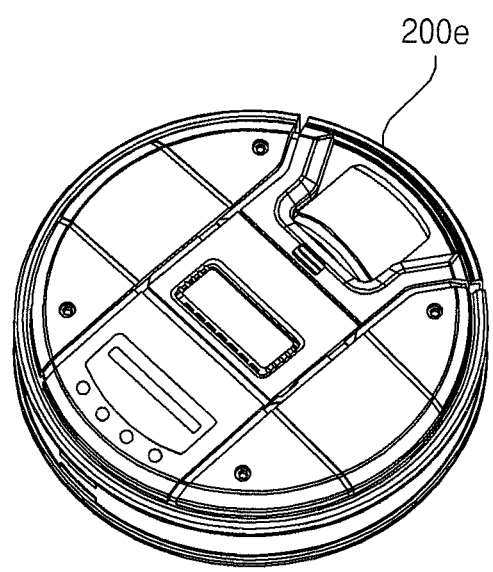

FIG. 2a shows a refrigerator 200a, FIG. 2b shows a washing machine 200b, FIG. 2c shows an air conditioner 200c, FIG. 2d shows a cooker 200d, and FIG. 2e shows a robot cleaner 200e.

Figure 3A:
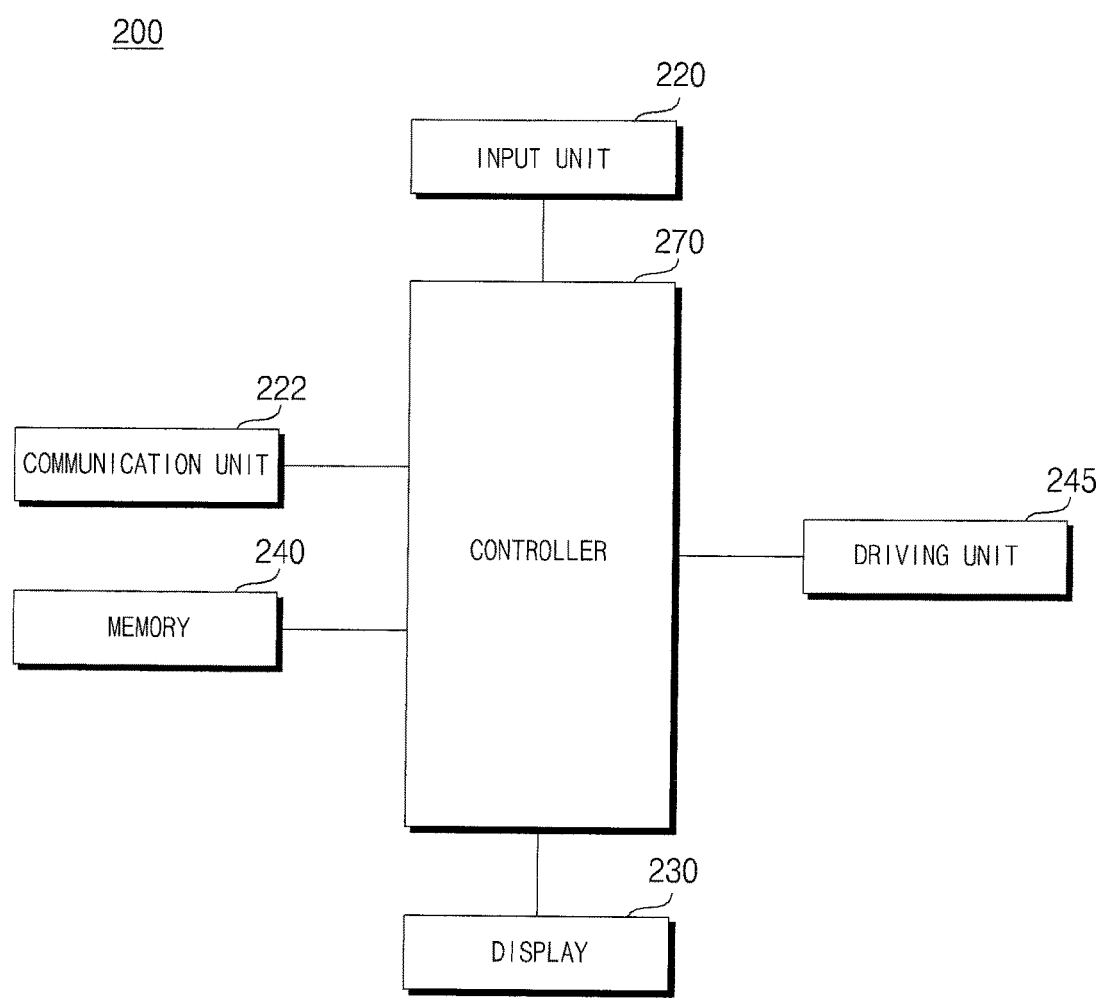
FIG. 3a is a block diagram showing the internal configuration of a home appliance of FIG. 1.

FIG. 3a is a block diagram showing the internal configuration of the home appliance of FIG. 1.

Referring to FIG. 3a, the home appliance 200 may include an input unit 220 for user input, a display 230 for displaying an operation state of the home appliance, a communication unit 222 for performing communication with another external device, a driving unit 245 for driving the home appliance and a controller 270 for controlling internal units such as the driving unit 245.

For example, if the home appliance is a refrigerator, the driving unit 245 may include a refrigerating compartment driving unit for driving a refrigerating compartment fan for supplying cooled air to a refrigerating compartment, a freezer compartment driving unit for driving a freezer compartment fan for supplying cooled air to a freezer compartment, and a compressor driving unit for driving a compressor for compressing a refrigerant.

As another example, if the home appliance is a washing machine, the driving unit 245 may include a driving unit for driving a drum or a tub.

As another example, if the home appliance is an air conditioner, the driving unit 245 may include a compressor driving unit for driving a compressor in an outdoor unit, an outdoor fan driving unit for driving a fan of the outdoor unit for heat exchange, and an indoor fan driving unit for driving a fan of an indoor unit for heat exchange.

As another example, if the home appliance is a cooker, the driving unit 245 may include a microwave driving unit for outputting microwaves into a cavity.

As another example, if the home appliance is a cleaner, the driving unit 245 may include a fan motor driving unit for air suction.

The communication unit 222 may include at least a near field communication (NFC) module (not shown) capable of performing NFC.

The communication unit 222 may access the AP apparatus 400, access the server 510 via the AP apparatus 400 or receive a power information signal from the server 510.

The controller 270 may control the driving unit 245 based on the power information signal received via the communication unit 222.

In addition, a memory 240 for storing data in the home appliance may be further included.

Figure 3B:

FIG. 3b is a block diagram showing the internal configuration of a communication unit of FIG. 3a.

The communication unit 222 may include a first interface 272 for data communication with the AP apparatus 400 located in the home and a second interface 274 for data communication with the server and, more particularly, a first server 510a.

For data communication with the first server 510a, if a data structure of a predetermined format is defined, the first interface 272 may perform data conversion according to the defined data structure such that data exchange is possible.

For data conversion, the first interface 272 may include an agent for the first server 510a.

Next, when Wi-Fi communication with the AP apparatus 400 is performed, the communication unit 222 may include a Wi-Fi communication module and the second interface 274 may include a Wi-Fi application for data exchange between the controller 270 and the AP apparatus 400. Thus, data conversion, etc. may be performed, which will be described with reference to FIG. 7.

Figure 4:
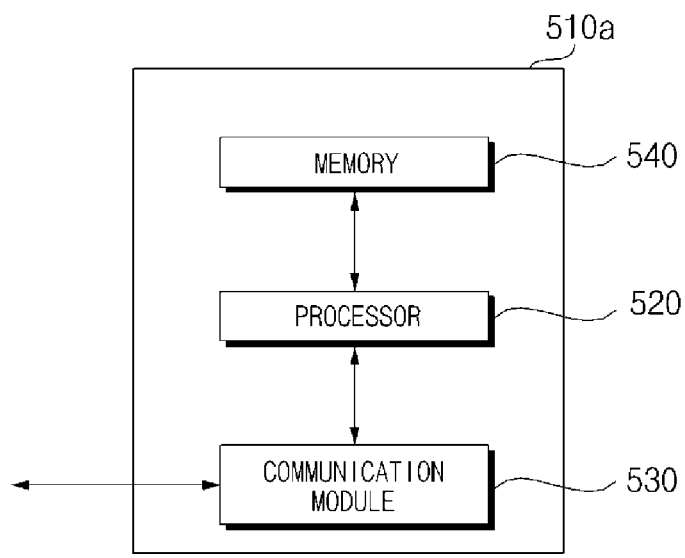
FIG. 4 is a block diagram showing the internal configuration of a server of FIG. 1.

FIG. 4 is a block diagram showing the internal configuration of the server of FIG. 1.

Referring to FIG. 4, the server 500 may include a communication module 530, a memory 540 and a processor 520.

The communication module 530 may receive home appliance related information and, more particularly, home appliance product information from the mobile terminal 300. The communication module 530 may transmit product information registration result information of the received home appliance product information to the mobile terminal 300.

The communication module 530 may include an Internet module or a mobile communication module.

The memory 540 may store the received home appliance product information and include the received product information for product registration of the home appliance.

The processor 520 may perform overall control of the server 500.

The processor 520 may control generation of the product registration result information of the home appliance when receiving the product information of the home appliance from the mobile terminal 300. The processor may control transmission of the generated product registration result information to the mobile terminal 300.

As another example, if the home appliance related information is power consumption information of the home appliance, the processor 520 may control transmission of power information, such as power price information, on peak time power information, off peak time power information, real-time power information, etc. stored in the memory 540, to the mobile terminal 300.

The server 500 may be managed by a manufacturer of the home appliance 200 or an operator of an application store related to the home appliance 200.

Figure 5:
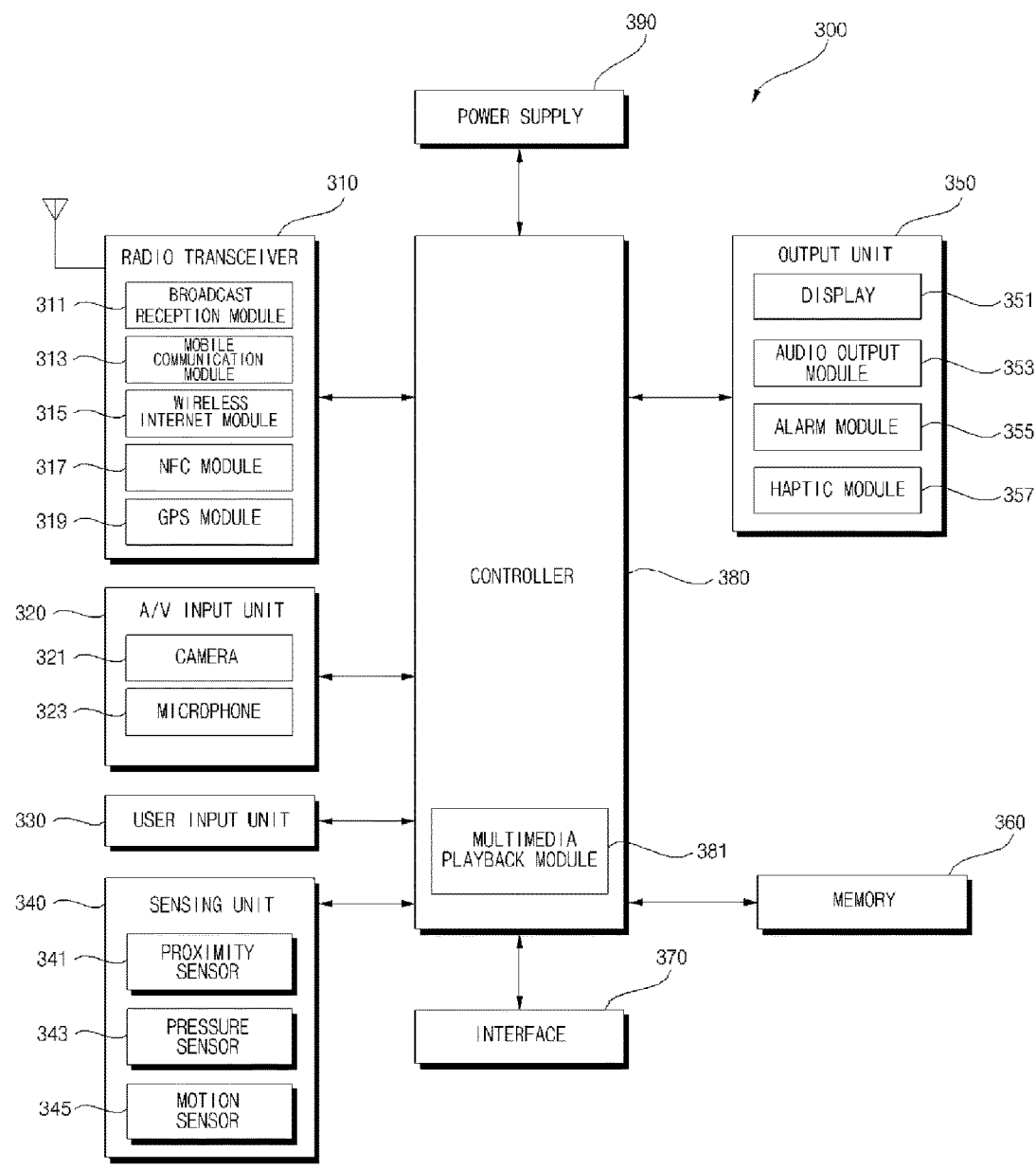
FIG. 5 is a block diagram showing the internal configuration of a mobile terminal of FIG. 1.

FIG. 5 is a block diagram showing the internal configuration of a mobile terminal of FIG. 1.

Referring to FIG. 5, the mobile terminal 300 may include a radio transceiver 310, an audio/video (A/V) input unit 320, a user input unit 330, a sensing unit 340, an output unit 350, a memory 360, an interface 370, a controller 380 and a power supply 390.

The radio transceiver 310 according to the embodiment of the present invention may exchange data with a server 500 via a network 550. For example, if the mobile terminal 300 is a power monitoring mode for an internal power grid, the radio transceiver 310 may transmit a power monitoring request and thus receive monitoring information. As another example, if the mobile terminal 300 is in a remote control mode for an internal power grid, the radio transceiver 310 may transmit a remote control signal and receive remote control result information.

The radio transceiver 310 may include a broadcast reception module 311, a mobile communication module 313, a wireless Internet module 315, a near field communication (NFC) module 317, a global positioning system (GPS) module 319, etc.

The broadcast reception module 311 may receive at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 311 may be stored in the memory 360.

The mobile communication module 313 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 315 is an internal or external module for wireless Internet access which may be provided to the mobile terminal 300. For example, the wireless Internet module 315 may perform Wi-Fi based wireless communication or Wi-Fi Direct based wireless communication.

The NFC module 317 may perform NFC. The NFC module 317 may receive data from the home appliance or transmit data to the home appliance, if an NFC tag or an NFC module is brought within a predetermined distance of the home appliance, that is, upon tagging.

As short-range wireless communication technology, Bluetooth, Radio-Frequency IDentification (RFID), Infrared Data Association (IrDA), Ultra WideBand (UWB), and ZigBee may be used.

The GPS module 319 may receive position information from a plurality of GPS satellites.

The A/V input unit 320 receives an audio signal or a video signal and may include a camera 321 and a microphone 323.

The user input unit 330 generates key input data enabling the user to control the operation of the mobile terminal. The user input unit 330 may include a keypad, a dome switch, a touchpad (static pressure/static electrical), etc. In particular, if the touchpad and the display 351 have a layered structure, this may be called a touchscreen.

The sensing unit 340 detects a current state of the mobile terminal 300 such as whether the mobile terminal 300 is opened or closed, the position of the mobile terminal 300 and contact/non-contact of a user and generates a sensing signal for controlling the operation of the mobile terminal 300.

The sensing unit 340 may include a proximity sensor 341, a pressure sensor 343 and a motion sensor 345. The motion sensor 345 may sense motion or position of the mobile terminal 300 using an acceleration sensor, a gyroscopic sensor and a gravity sensor. In particular, the gyroscopic sensor measures an angular speed and senses a direction (angle) in which the mobile terminal rotates from a reference direction.

The output unit 350 may include a display 351, an audio output module 353, an alarm unit 355 and a haptic module 357.

The display 351 displays information processed by the mobile terminal 300.

As described above, if the display 351 and the touchpad have the layered structure to configure the touchscreen, the display 351 can be used not only as an output device but also as an input device for inputting information via user touch.

The audio output module 353 may output audio data received from the radio transceiver 310 or stored in the memory 360. The audio output module 353 may include a speaker, a buzzer, etc.

The alarm unit 355 outputs a signal notifying the user that an event has occurred in the mobile terminal 300. For example, the alarm unit 355 may output a signal in the form of vibrations.

The haptic module 357 generates a variety of tactile effects that the user can feel. A typical example of the tactile effect generated by the haptic module 357 is vibration.

The memory 360 may store a program for processing and control of the controller 380 and may temporarily store input or output data (for example, a phonebook, messages, still images, and moving images).

The interface 370 serves as an interface with all external devices connected to the mobile terminal 300. The interface 370 may receive data from an external device or receive power and transmit power to the components of the mobile terminal 300 or transmit data of the mobile terminal 300 to an external device.

The controller 380 controls the overall operation of the mobile terminal 300. For example, the controller 380 performs control and processing associated with voice communication, data communication, video communication, and the like. The controller 380 may include a multimedia playback module 381 for multimedia playback. The multimedia playback module 381 may be implemented in the controller 380 in hardware form or may be implemented in software form separately from the controller 380.

The power supply 390 receives external power or internal power and supplies power required for operation to each component under control of the controller 380.

The block diagram of the mobile terminal 300 shown in FIG. 5 is only exemplary. Depending upon the specifications of the mobile terminal 300 in actual implementation, the components of the mobile terminal 300 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 6A:
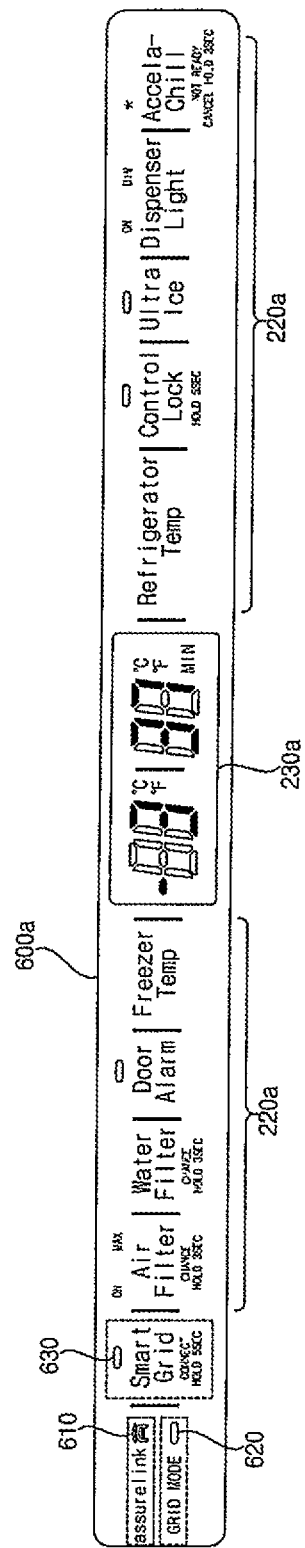
Figure 6B:
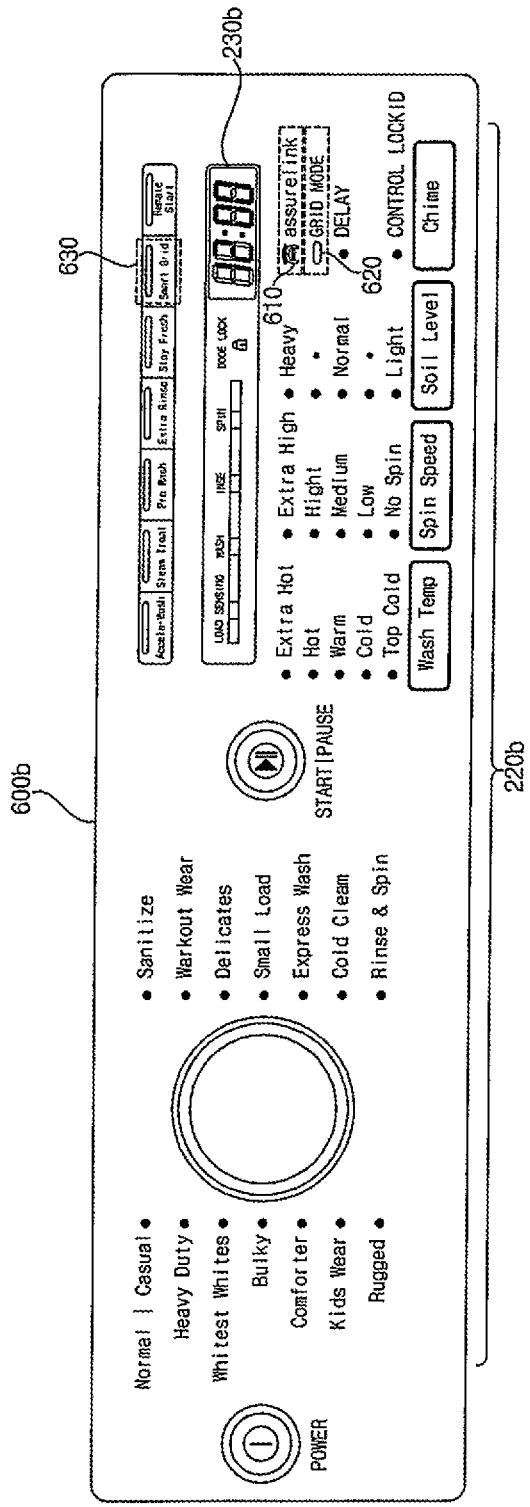
Figure 6C:
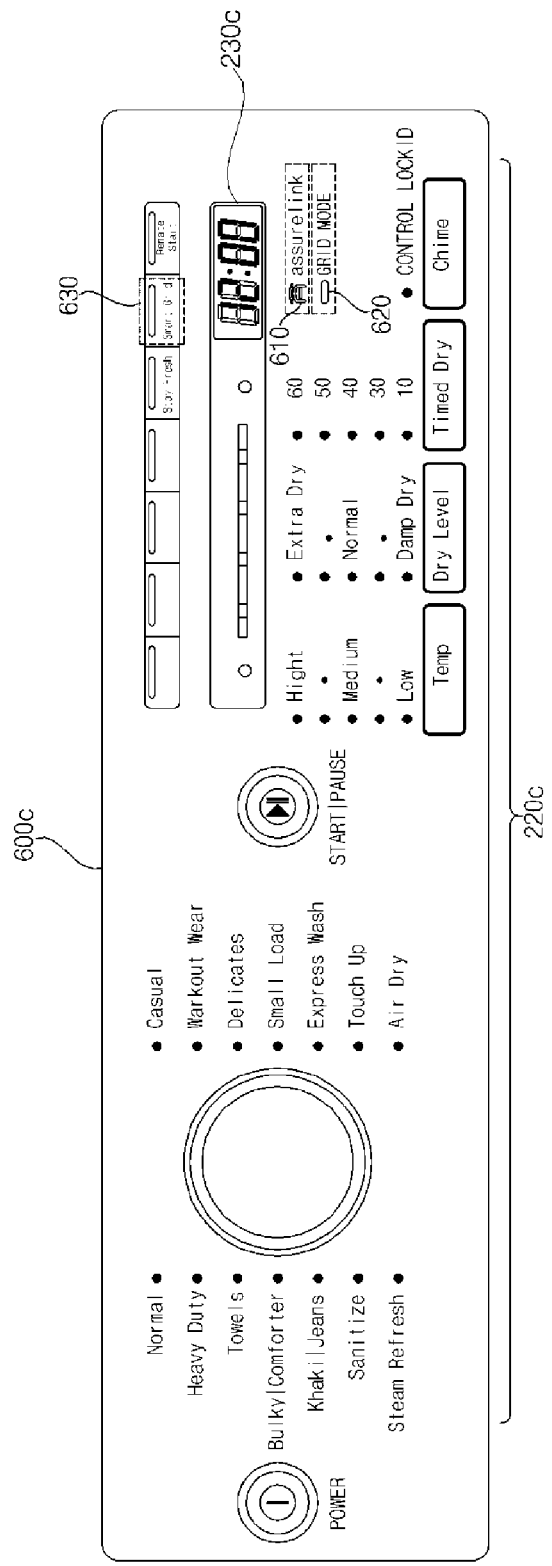

FIGS. 6a to 6c are diagrams showing various examples of an operation panel of the home appliance of FIG. 3.

First, FIG. 6a shows an example of an operation panel 600a of a refrigerator 200a.

The operation panel 600a may include a display and an input unit. In particular, in FIG. 6a, a display panel 230a and an input unit 220a for performing a variety of input are included.

In association with the embodiment of the present invention, in addition to the display and the input unit, a network connection related indicator 610, a grid mode related indicator 620 and a smart grid related indicator 630 may be included.

The network connection related indicator 610 may display information indicating whether the home appliance 200 is connected to the AP apparatus 400 or the server 50.

The network connection related indicator 610 may function as an input unit as well as a display. For example, if the network connection related indicator 610 or the smart grid related indicator 630 is pressed after power is initially turned on, a network connection operation may be performed as a network on mode. At this time, the driving unit 245 of the home appliance 200 may operate separately from network configuration.

If the network connection related indicator 610 or the smart grid related indicator 630 is pressed once more, the network may be disconnected as a network off mode.

The network connection related indicator 610 may be turned off when the home appliance is not connected to the AP apparatus 400, may be turned on with a first pattern when the home appliance is connected to the AP apparatus 400 but is not connected to the server 500 and may be turned on with a second pattern when the home appliance is connected to both the AP apparatus 400 and the server 500.

The first pattern may mean blinking and the second pattern may mean that the indicator is constantly turned on.

The grid mode related indicator 620 may operate as a display only. For example, when a demand response (DR) signal is received via the server 500, the grid mode related indicator 620 may be turned on. Otherwise, the grid mode related indicator 620 may be turned off.

The grid mode related indicator may operate in association with the smart grid related indicator 630. That is, if a DR signal is received in a state in which the smart grid related indicator 630 is turned on, the grid mode related indicator 620 may be turned on.

The smart grid related indicator 630 may function as an input unit as well as a display.

For example, if the user presses the smart grid related indicator 630 in a state in which the smart grid mode is turned off, the smart grid mode may be turned on. When the smart grid related indicator 630 is pressed once more, the smart grid mode may be turned off.

The smart grid related indicator 630 indicates that the smart grid mode is possible and may be turned on when the smart grid mode is performed, regardless of driving for power saving based on the DR signal, after the DR signal has been received.

Thus, the smart grid related indicator 630 may operate in association with the network connection related indicator 610.

The smart grid related indicator 630 may operate in association with network connection. For example, the smart grid related indicator 630 may be turned on with a first pattern if the home appliance exchanges data before being connected to the AP apparatus 400 and may be turned on with a second pattern when the home appliance is connected to the AP apparatus 400. The smart grid related indicator may be turned on with the second pattern when the home appliance is connected to the server 500 after being connected to the AP apparatus 400.

The first pattern may mean blinking and the second pattern may mean that the indicator is constantly turned on.

Although not shown, a remote control related indicator (not shown) may be further included in the operation panel 600a of the refrigerator 200a.

Next, FIG. 6b shows an example of a display 230 of a washing machine 200.

An operation panel 600b may include a display and an input unit. In particular, the operation panel may include a display panel 230b and an input unit 220b for performing a variety of input.

In association with the embodiment of the present invention, in addition to the display and the input unit, a network connection related indicator 610, a grid mode related indicator 620 and a smart grid related indicator 630 may be included.

The operations of the network connection related indicator 610, the grid mode related indicator 620 and the smart grid related indicator 630 have been described with reference to FIG. 6a.

Next, FIG. 6c shows an example of a display 230 of a drier 200.

An operation panel 600c may include a display and an input unit. In particular, the operation panel may include a display panel 230c and an input unit 220c for performing a variety of input.

In association with the embodiment of the present invention, in addition to the display and the input unit, a network connection related indicator 610, a grid mode related indicator 620 and a smart grid related indicator 630 may be included.

The operations of the network connection related indicator 610, the grid mode related indicator 620 and the smart grid related indicator 630 have been described with reference to FIG. 6a.

Figure 7:
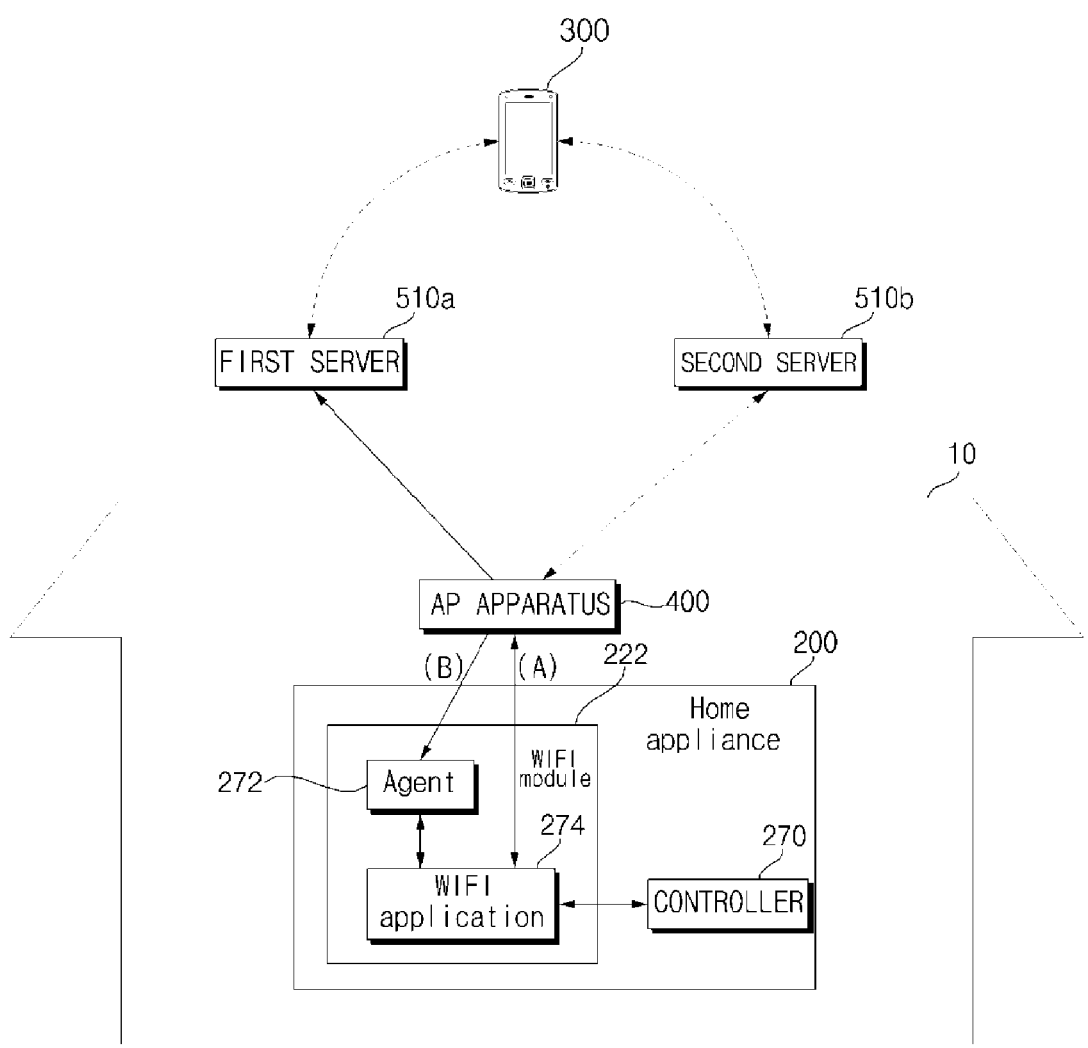
FIG. 7 is a diagram showing the configuration of a communication system according to an embodiment of the present invention.

FIG. 7 is a diagram showing the configuration of another example of a communication system according to an embodiment of the present invention.

Referring to FIG. 7, the home appliance 200 located in the home 10 may be connected to the server 500 via the AP apparatus 400 such as a gateway. The server 500 may be divided into a first server 510a and a second server 510b.

The first server 510a stores and provides home appliance related information and may be provided by a manufacturer or vendor of the home appliance.

The second server 510b may transmit power information related to a smart grid operation to the home appliance or receive power consumption information of the home appliance. For example, the second server 510b may provide a DR signal.

A service such as power information of the second server 510b may be provided by the first server 510a.

The mobile terminal 300 located outside the home may access the servers 510a and 510b to provide a screen for product registration, remote control, power consumption, operation state monitoring, etc. of the home appliance.

The communication unit 222 of the home appliance 200 may include a first interface 272 for data communication with the AP apparatus 400 located in the home and a second interface 274 for data communication with the server and, more particularly, the first server 510a.

For data communication with the first server 510a, if a data structure of a predetermined format is defined, the first interface 272 may perform data conversion according to the defined data structure such that data exchange is possible.

For data conversion, the first interface 272 may include an agent for the first server 510a.

Next, when Wi-Fi communication with the AP apparatus 400 is performed, the communication unit 222 may include a Wi-Fi communication module and the second interface 274 may include a Wi-Fi application 274 for data exchange between the controller 270 and the AP apparatus 400. Thus, data conversion, etc. may be performed.

For data exchange with the server, data output from the controller 270 may be subjected to primary data conversion in the Wi-Fi application 274, may be subjected to secondary data conversion in the agent 272 for the first server 510a, and may be transmitted to the first server 510a via the AP apparatus 400, and vice versa.

Data which is not related to the first server 510a may be subjected to primary data conversion in the Wi-Fi application 274 without conversion by the agent 272 for the first server 510a and then may be transmitted to the AP apparatus 400, and vice versa.

Figure 8:
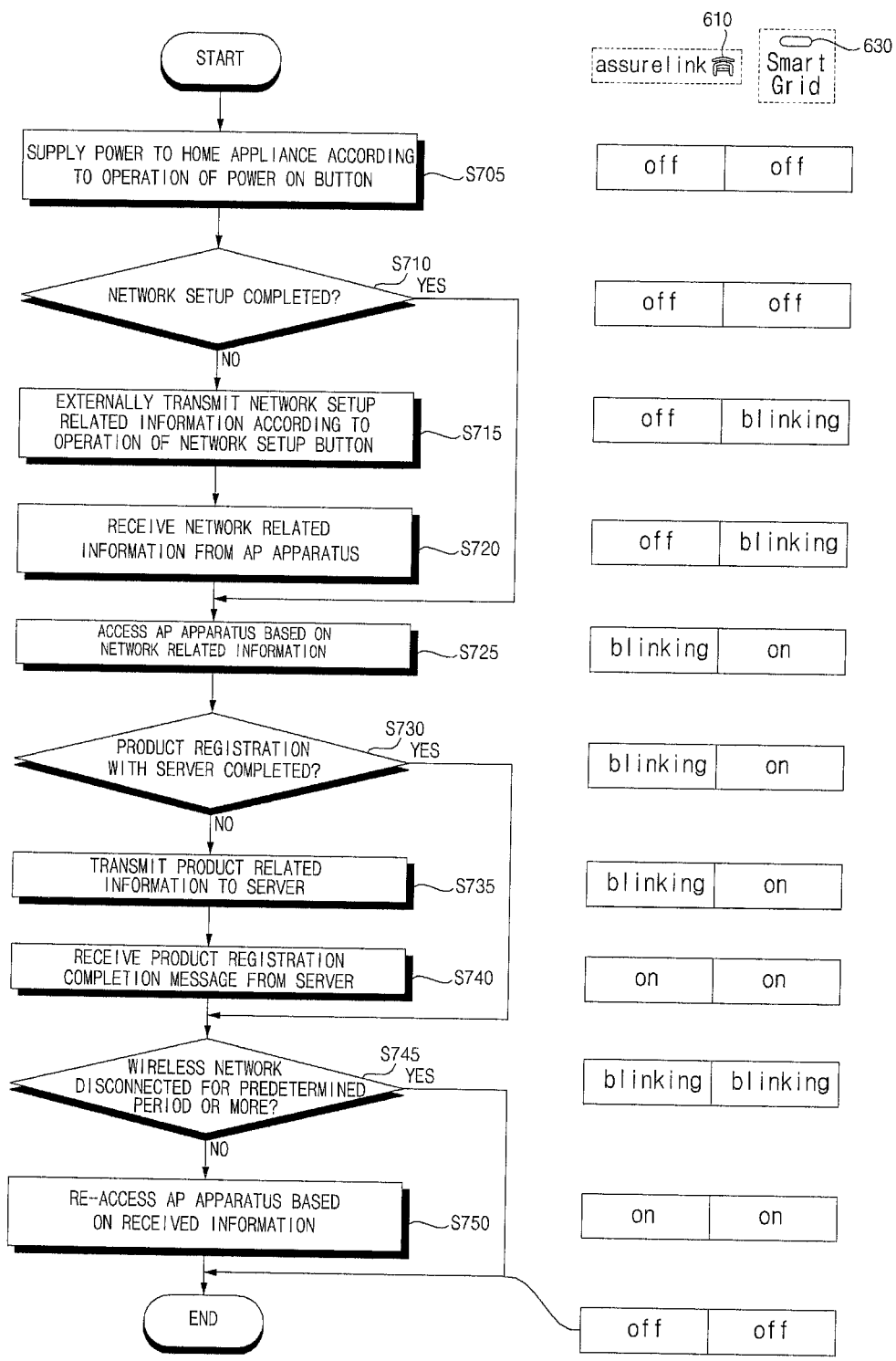
FIG. 8 is a flowchart illustrating a method for operating a home appliance according to an embodiment of the present invention.
Figure 9:
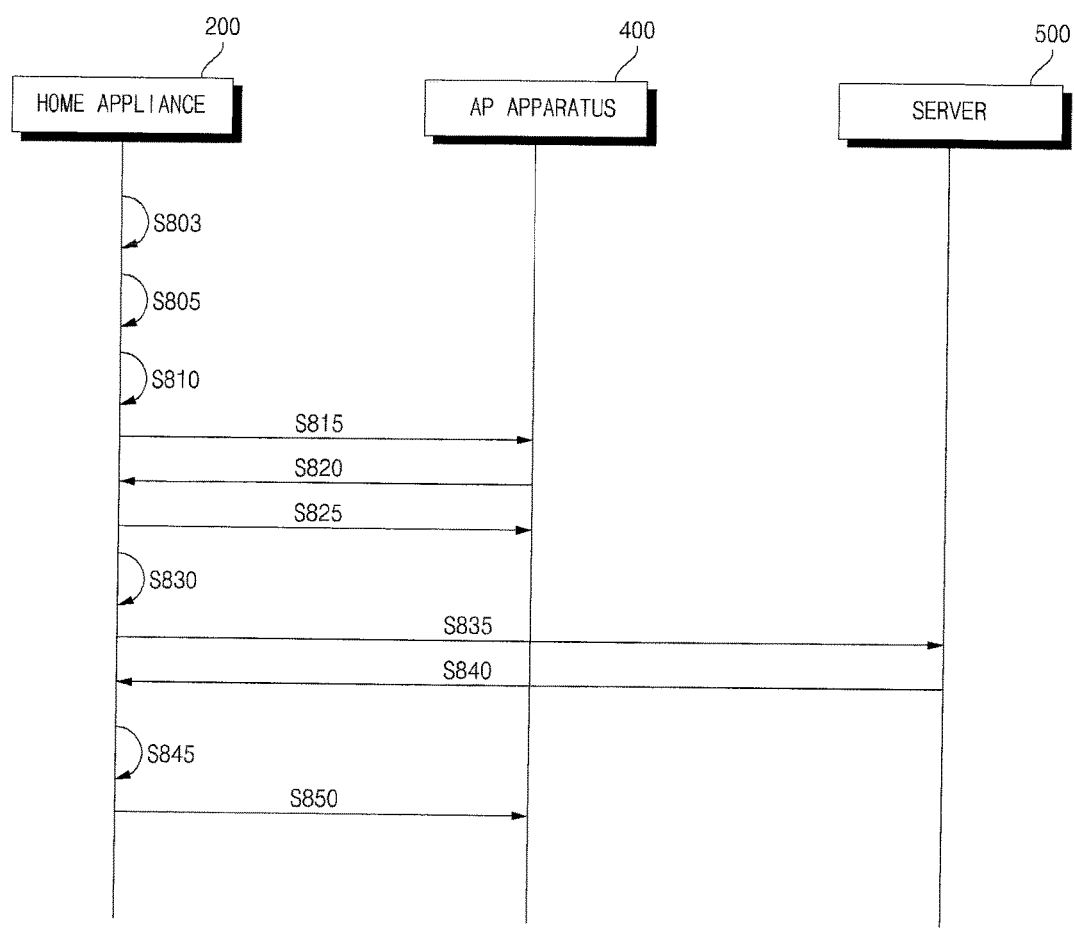
FIGS. 9 to 10c are views referred to for describing the operating method of FIG. 8.
Figure 10A:
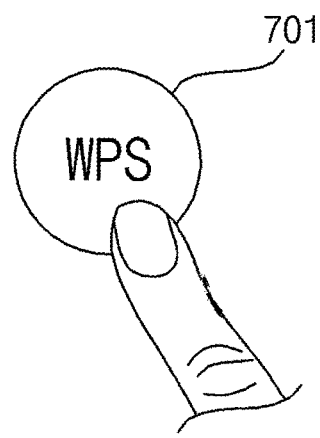
Figure 10B:
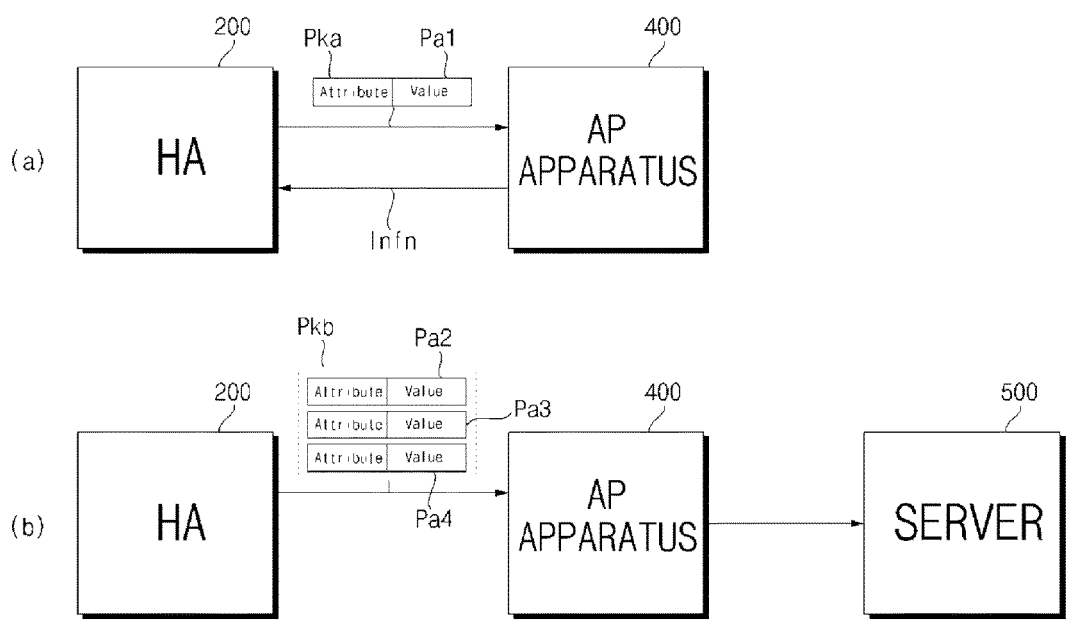
Figure 10C:
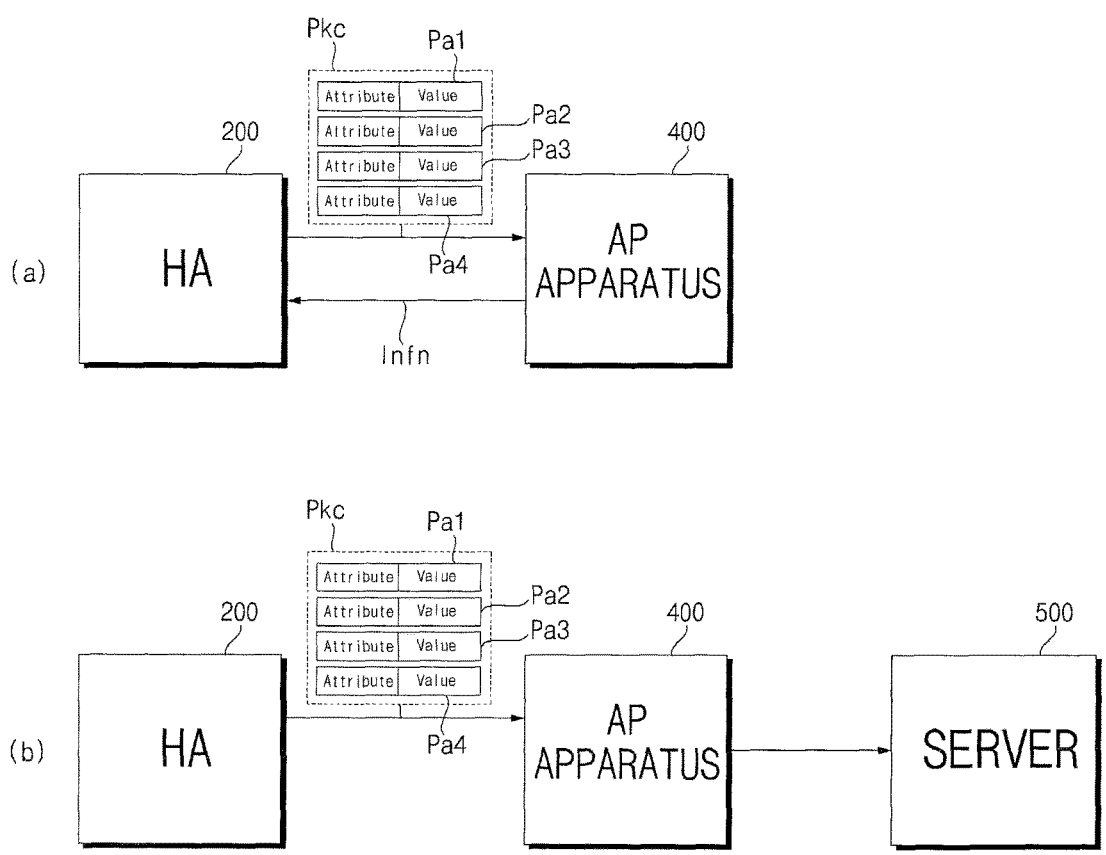

FIG. 8 is a flowchart illustrating a method for operating a home appliance according to an embodiment of the present invention, and FIGS. 9 to 10c are views referred to for describing the operating method of FIG. 8.

Power is supplied to the home appliance 200 according to operation S803 of a power button (S705). Step S705 corresponds to step S805 of FIG. 9.

For example, power is supplied to the home appliance based on operation of a power button of FIGS. 6a to 6c.

More specifically, a converter (not shown) for converting a commercial AC voltage into a DC voltage based on operation of the power button and the voltage is supplied to the controller 270, the driving unit 245, etc.

At this time, if input is not performed, power is supplied to each module of the home appliance 200 but each module may be in a standby mode.

In step S705, the network connection related indicator 610 and the smart grid related indicator 630 are in an off state.

Next, the home appliance 200 transmits network setup related information to an external device according to operation of a network setup button (S715) if network setup is not completed (S710). Then, the home appliance receives network related information from the AP apparatus (S720). Then, the home appliance accesses the AP apparatus based on the network related information (S725). Steps S710 to S725 correspond to steps S810 to S825 of FIG. 9, respectively.

If the user operates the network setup button of the home appliance upon initial operation of the home appliance, a network setup mode may be performed.

Alternatively, the network setup mode may be automatically performed when the home appliance is initially powered on or when network setup is not completed.

The network setup button 701 may be separately provided on the operation panel as shown in FIG. 10a or may be replaced with the network connection related indicator.

The controller 270 of the home appliance 200 may control performance of the network setup mode when the network connection related indicator 610 or the smart grid related indicator 630 is pressed in a state in which network setup is not completed.

For example, if the smart grid related indicator 630 is pressed for a first time (e.g., 5 seconds), the network setup mode may be performed.

For network setup, the communication unit 222 and, more particularly, the Wi-Fi application 274 of the communication unit 222 may transmit the network setup related information to the AP apparatus 400. More specifically, the communication unit 222 may transmit port information of the home appliance to the AP apparatus 400. The port information may be UDP port information or TCP port information, for example.

The communication unit 222 transmits a single data packet including a plurality of attribute data and values of the attribute data to the AP apparatus 400 or the server 500 when a predetermined event occurs.

More specifically, as described above, when a network setup event occurs, as shown in (a) of FIG. 10b, the home appliance 200 may transmit a data packet Pka including attribute data for port information and a value of the attribute data to the AP apparatus 400. In the figure, one data packet Pka includes a pair of attribute data and a value of the attribute data.

As another example, when a network setup event occurs, as shown in (a) of FIG. 10c, the home appliance 200 may transmit, to the AP apparatus 400, a data packet Pkc including a first pair pa1 including attribute data for port information and a value of the attribute data, a second pair pa2 including attribute data for a product id and a value of the attribute data, a third pair pa3 including attribute data for a device name and a value of the attribute data and a fourth pair pa4 including attribute data for a device password and a value of the attribute data as a single data packet. The data packet Pkc may further include a pair including attribute data for a domain name of a server and a value of the attribute data.

The AP apparatus 400 may receive network setup related information from the home appliance 200 and transmit network related information to the home appliance 200 in response thereto.

The home appliance 200 receives network related information. The network related information may include at least one of port information, TCP/IP information, MAC address information, network identifier information (service set identifier (SSID)), etc. of the AP apparatus 400.

The Wi-Fi application 274 of the home appliance 200 receives network related information and accesses the AP apparatus 400 using the received network related information under control of the controller 270.

The memory 240 stores the received network related information for future use.

If the smart grid related indicator 630 operates such that the home appliance enters the network setup mode, the smart grid related indicator 630 may be turned on with a first pattern, that is, blink, in step S715 among steps S710 to S720.

The network connection related indicator 610 is turned off during steps S710 to S720.

In step S725 in which the home appliance 200 accesses the AP apparatus 400, the network connection related indicator 610 may be turned on with the first pattern and the smart grid related indicator 630 may be turned on with the second pattern. The first pattern may mean blinking and the second pattern may mean that the indicator is constantly turned on.

Next, the home appliance 200 determines whether product registration with the server is completed (S730) and transmits the product related information to the server (S735) if product registration is not performed. Then, the home appliance receives a product registration completion message from the server (S740). Steps S730 to S740 correspond to steps S830 to S840 of FIG. 8, respectively.

The controller 270 of the home appliance 200 may attempt to perform product registration with the server through separate user input.

Alternatively, the controller 270 of the home appliance 200 may transmit product related information to the server after accessing the AP apparatus 400.

For example, the communication unit 222 may transmit the network setup related information before accessing the AP apparatus 400 and transmit the product related information after accessing the AP apparatus 400.

The network setup related information includes port information of the communication unit 222 and the product related information may include at least one of a product id, a device name and a device password.

The communication unit 222 may transmit a single packet per event. For example, when a server product registration event occurs, for product registration with the server, attribute data for a product id, a device name, a device password or a server domain name and a value of the attribute data may be grouped and transmitted.

The communication unit 222 may receive a product registration completion message from the server 500 when product registration with the server 500 is completed. The received product registration completion message is stored in the memory 240.

If product registration is attempted through user input in a state in which product registration is completed, the controller 270 may not perform product registration based on the product registration completion message stored in the memory 240.

If the network setup event occurs, as shown in (a) of FIG. 10b, the home appliance 200 may transmit a data packet Pka including attribute data for port information and a value of the attribute data to the AP apparatus 400. In the figure, one data packet Pka includes a pair of attribute data and a value of the attribute data.

When a server registration event occurs, as shown in FIG. 10(b), the home appliance 200 may transmit, to the AP apparatus 400, a data packet Pkb including a first pair pa1 including attribute data for port information and a value of the attribute data, a second pair pa2 including attribute data for a product id and a value of the attribute data, a third pair pa3 including attribute data for a device name and a value of the attribute data and a fourth pair pa4 including attribute data for a device password and a value of the attribute data as a single data packet. The data packet Pkb may be transmitted to the server 500 unlike (a) of FIG. 10b.

The data packet Pkb may further include a pair including attribute data for a domain name of a server and a value of the attribute data.

As another example, the communication unit 222 may transmit the network setup related information and the product related information before and after accessing the AP apparatus 400. The communication unit 222 may transmit address information of the server when the product related information is transmitted.

When a network setup event occurs, as shown in (a) of FIG. 10c, the home appliance 200 may transmit, to the AP apparatus 400, a data packet Pkc including a first pair pa1 including attribute data for port information and a value of the attribute data, a second pair pa2 including attribute data for a product id and a value of the attribute data, a third pair pa3 including attribute data for a device name and a value of the attribute data and a fourth pair pa4 including attribute data for a device password and a value of the attribute data as a single data packet. The data packet Pkc may further include a pair including attribute data for a domain name of a server and a value of the attribute data.

When a server registration event occurs, as shown in (b) of FIG. 10c, the home appliance 200 transmits the data packet Pkc. The data packet Pkc may be transmitted to the server 500 unlike (a) of FIG. 10c.

During steps S730 to S735, the network connection related indicator 610 is turned on with the first pattern and the smart grid related indicator 630 is turned on with the second pattern.

In step S740, since the home appliance 200 is connected to the server 400, the network connection related indicator 610 and the smart grid related indicator 630 may be turned on with the second pattern, that is, may be constantly turned on.

Next, the home appliance 200 determines whether wireless network disconnection continues for a predetermined period (S745) and re-accesses the AP apparatus based on the received information if wireless network disconnection does not continue (S750). Steps S745 to S750 correspond to steps S845 to S850 of FIG. 9, respectively.

The home appliance 200 attempts to re-access the AP apparatus 400 for a predetermined time (e.g., 2 minutes), if the home appliance is temporarily disconnected from the AP apparatus 400. The home appliance attempts to access the AP apparatus 400 based on the network related information of the AP apparatus 400 stored in the memory 240.

The home appliance 200 decides that the home appliance is disconnected from the AP apparatus, that is, remains in a non-connection state, if the home appliance is disconnected from the AP apparatus 400 for the predetermined time or more.

In step S745, the home appliance 200 may turn the network connection related indicator 610 and the smart grid related indicator 630 on with the first pattern (blinking) if the home appliance is temporarily disconnected from the AP apparatus 400 for the predetermined time.

Unlike the figure, in step S745, the smart grid related indicator 630 may be turned on. At this time, blinking of the network connection related indicator 610 in step S745 is preferably different from blinking in steps S725 to S735. That is, different first patterns may be used.

More specifically, a ratio of on timing to off timing of the network connection related indicator 610 in steps S725 to S735 may be 1:1 but a ratio of on timing to off timing in step S745 may not be 1:1. Accordingly, the user may identify temporary disconnection of the network.

Since the home appliance re-accesses the server in step S750, similarly to step S740, the network connection related indicator 610 and the smart grid related indicator 630 may be turned on with the second pattern, that is, may be constantly turned on.

When the wireless network is disconnected for a predetermined time or more, the network connection related indicator 610 and the smart grid related indicator 630 are turned off.

A state in which the communication unit 222 of the home appliance 200 does not receive the network related information from the AP apparatus 400 may be referred to as an un-provisioned state, a state in which the communication unit 222 of the home appliance 200 attempts to access the AP apparatus 400 is referred to as a provisioning state, a state in which the communication unit 222 of the home appliance 200 receives and stores the network related information regardless of connection with the AP apparatus 400 is a provisioned state, and a state in which the communication unit 222 of the home appliance 200 is connected/disconnected to/from the AP apparatus 400 is a referred to as a connected/disconnected state.

A state in which the communication unit 222 of the home appliance 200 is not registered with the server 500 is referred to as an un-registered state, a state in which the communication unit 222 of the home appliance 200 attempts to access the server 500 is referred to as a registering state, a state in which the communication unit 222 of the home appliance 200 is initially registered with the server 500 is referred to as a registered state, and a state in which the communication unit 222 of the home appliance 200 is connected/disconnected to/from the server 500 is referred to as a connected/disconnected state.

Figure 11:
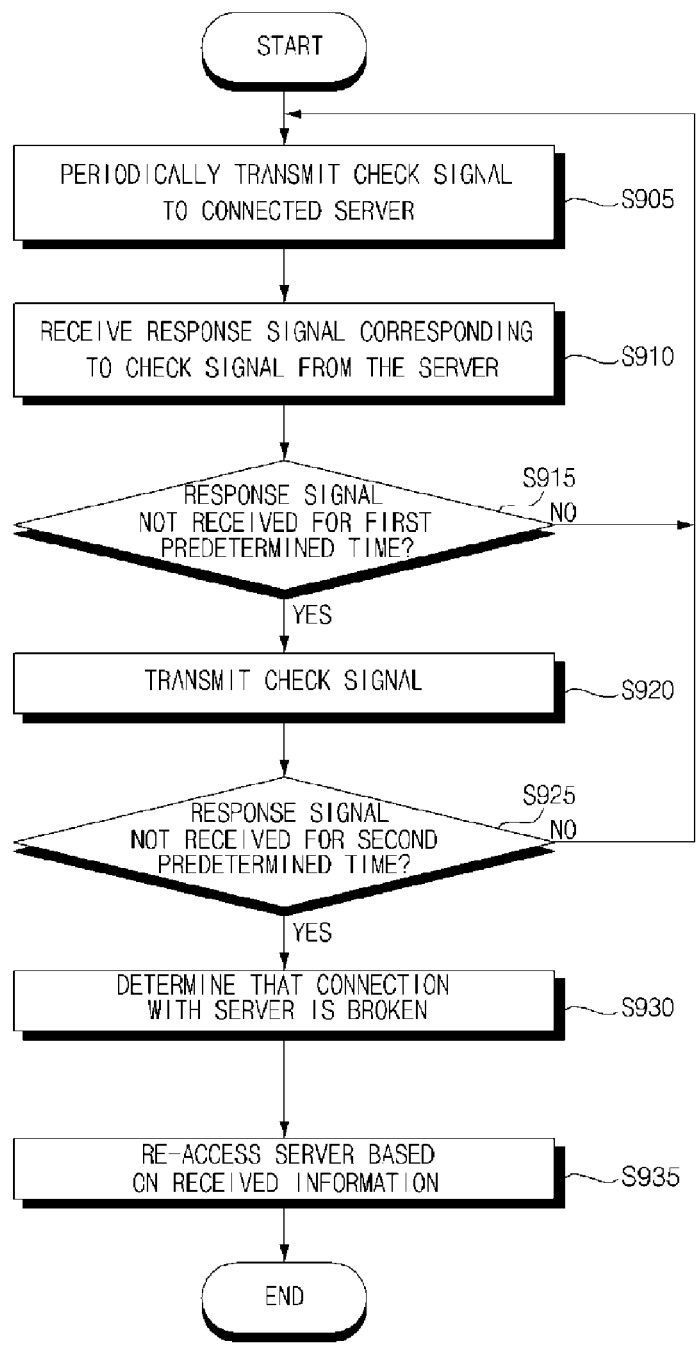
FIG. 11 is a flowchart illustrating a method for operating a home appliance according to another embodiment of the present invention.
Figure 12:
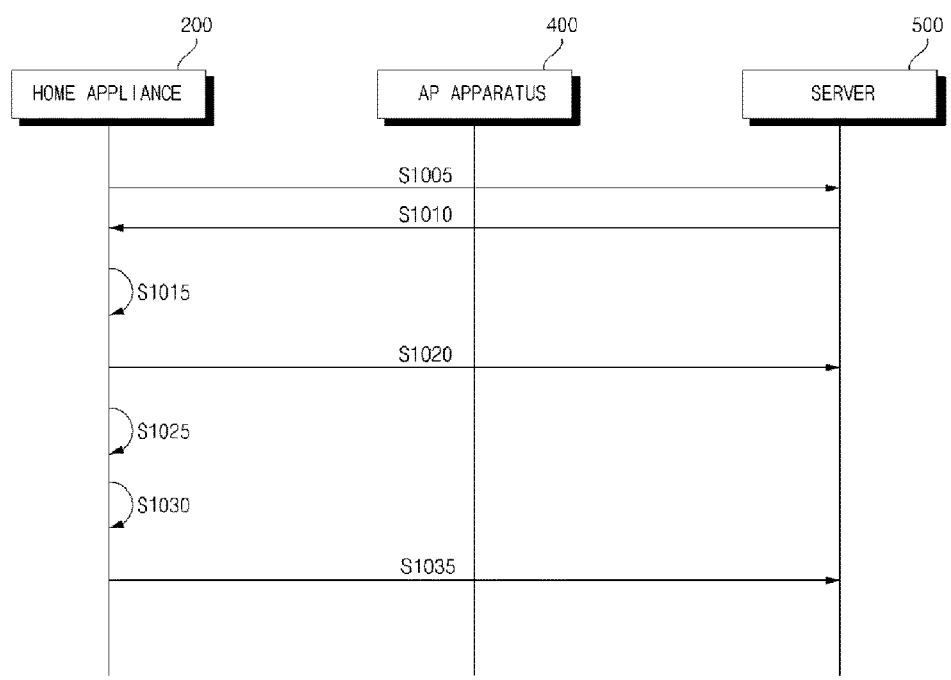
FIGS. 12 to 13b are views referred to for describing the operating method of FIG. 11.
Figure 13A:
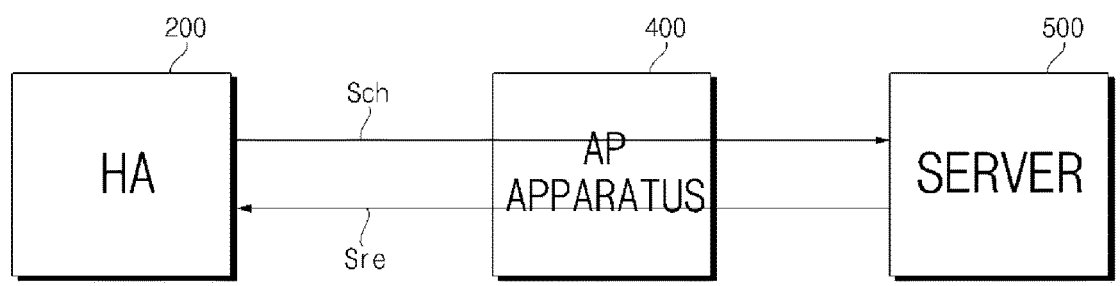
Figure 13B:
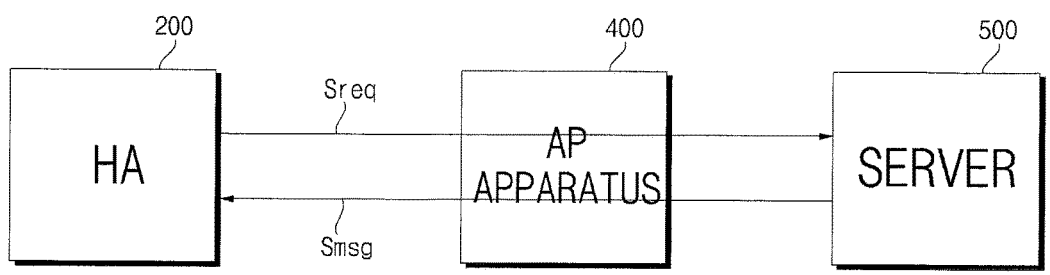

FIG. 11 is a flowchart illustrating a method for operating a home appliance according to another embodiment of the present invention, and FIGS. 12 to 13b are views referred to for describing the operating method of FIG. 11.

The communication unit 222 of the home appliance 200 periodically transmits a check signal to the accessed server (S905) and receives a response signal corresponding to the check signal from the server (S910). Steps S905 to S910 correspond to steps S1005 to S1010 of FIG. 12, respectively.

More specifically, the communication unit 222 of the home appliance 200 may transmit the check signal every minute.

The check signal may be a heartbeat signal and the response signal may be a response signal to the heartbeat signal.

The home appliance 200 may transmit a single data packet including attribute data for an appliance status and a control lock status and a value of the attribute data as a check signal and receive a response signal from the server 500.

FIG. 13a shows the case in which a check signal Sch is output from the home appliance 200 and is transmitted to the server 500 via the AP apparatus 400 and a response signal Sre is output from the server 500 and is input to the home appliance 200 via the AP apparatus 400.

Next, the home appliance 200 determines whether the response signal is not received for a first predetermined time and, if so, retransmits the check signal (S920). Steps S915 to S920 correspond to steps S1015 to S1020 of FIG. 12, respectively.

The controller 270 of the home appliance 200 retransmits the check signal when the response signal is not received for the first predetermined time. The first predetermined time may correspond to 2 minutes, for example. When the check signal is transmitted every 1 minute, the controller 270 of the home appliance 200 may retransmit the check signal when the response signal is not received twice.

The retransmitted check signal may be a heartbeat signal. Alternatively, the retransmitted check signal may include a single data packet including attribute data for a home appliance status and a control lock status and a value of the attribute data.

FIG. 13b shows the case in which a retransmission check signal Sreq is output from the home appliance 200 and is transmitted to the server 500 via the AP apparatus 400 and a response signal Smsg is output from the server 500 and is input to the home appliance 200 via the AP apparatus 400.

After retransmission, the home appliance 200 determines whether the response signal is not received for a second predetermined time (S925) and, if so, determines that connection with the server is broken (S930). The home appliance 200 re-accesses the server based on the received information. Step S925 corresponds to step S1025 of FIG. 12.

The controller 270 of the home appliance 200 determines that the home appliance is disconnected from the server 500 when the response signal is not received for the second predetermined time. The second predetermined time is preferably less than the first predetermined time. In order to check the connection state immediately after retransmission, the second predetermined time is preferably set to be short. For example, the second predetermined time may correspond to 1 minute. The controller 270 of the home appliance 200 determines that the home appliance is disconnected from the server 500, when the response signal is not received for 1 minute, that is, when the response signal is not received once.

When connection with the server 500 is broken but is connection with the AP apparatus 400 is maintained, as described above, the network connection related indicator 610 may blink and the smart grid related indicator 630 may be constantly turned on.

Figure 14:
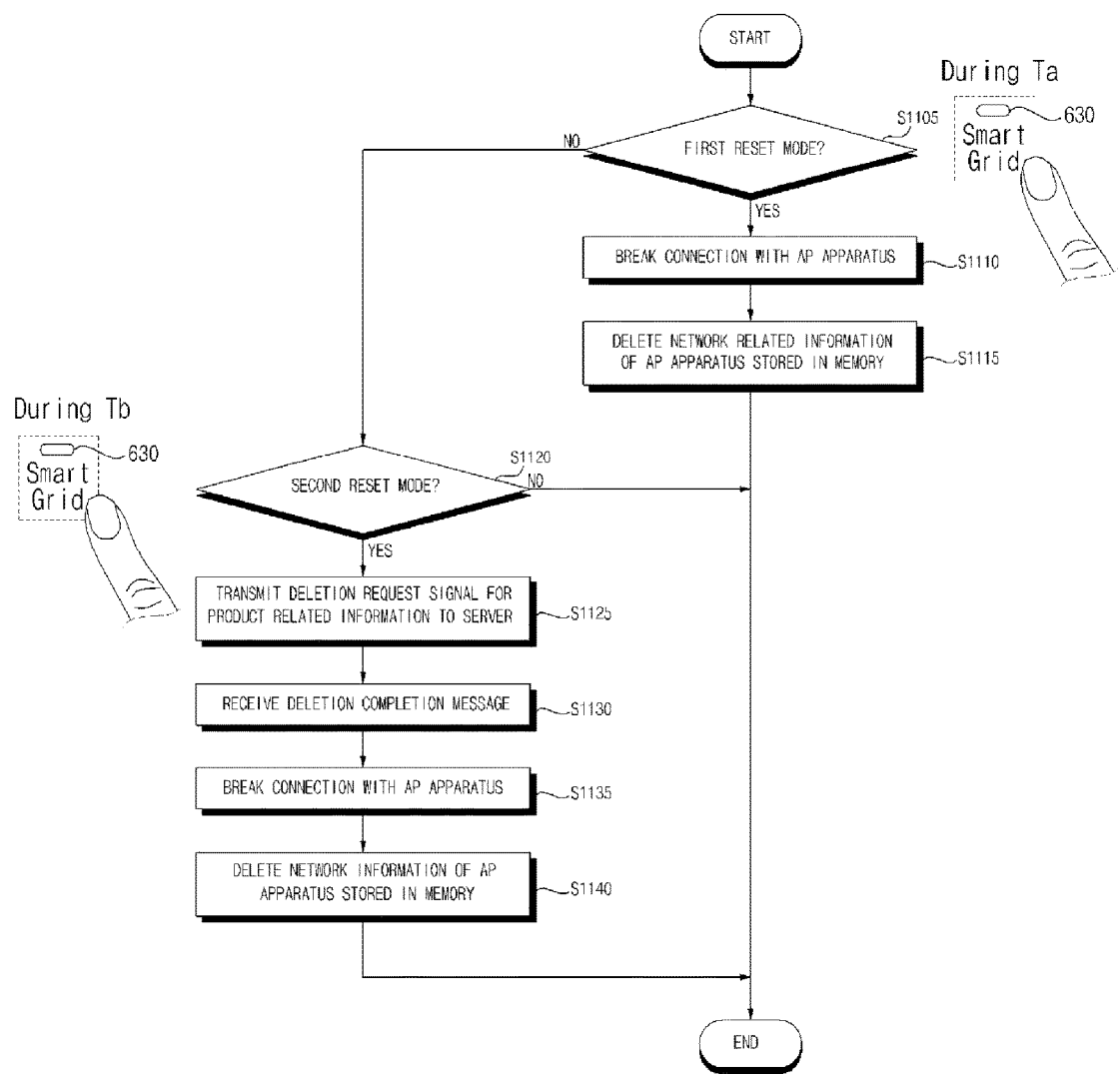
FIG. 14 is a flowchart illustrating a method for operating a home appliance according to another embodiment of the present invention.
Figure 15:
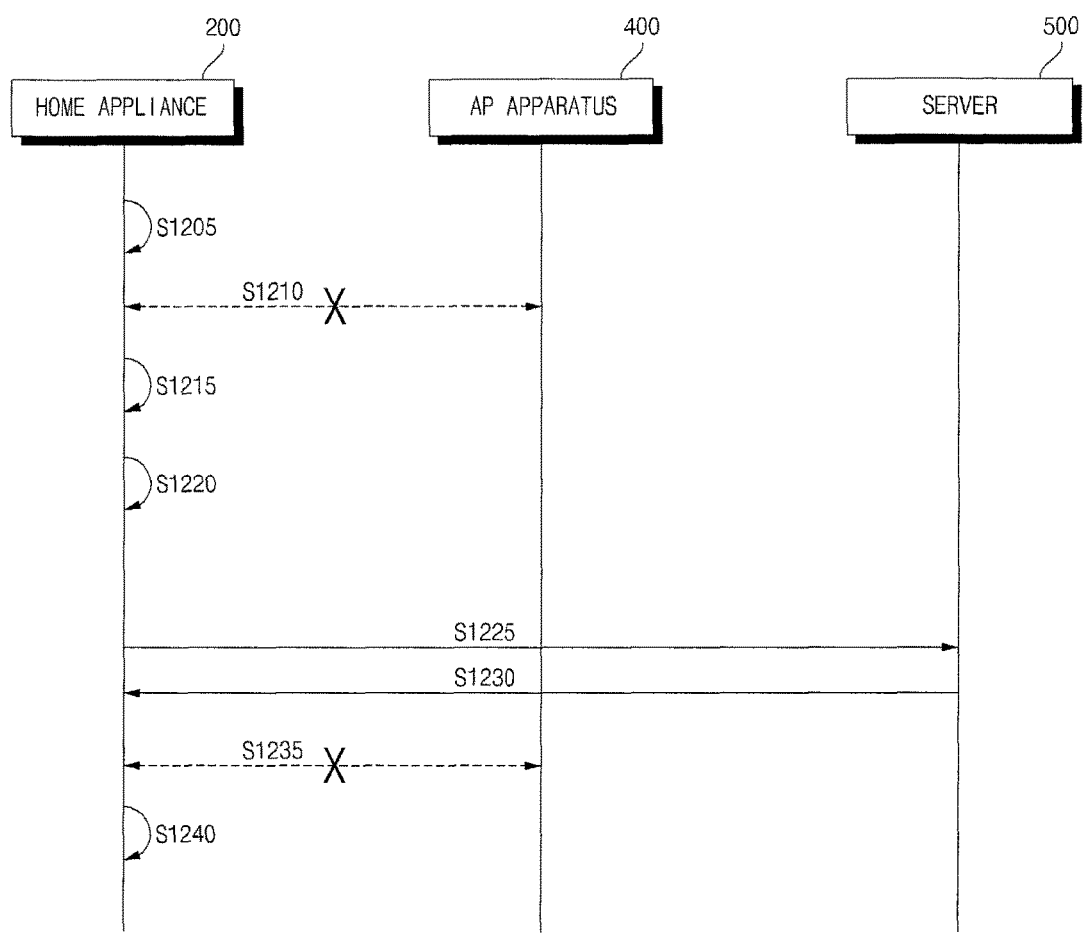
FIGS. 15 to 16b are views referred to for describing the operating method of FIG. 14.
Figure 16A:
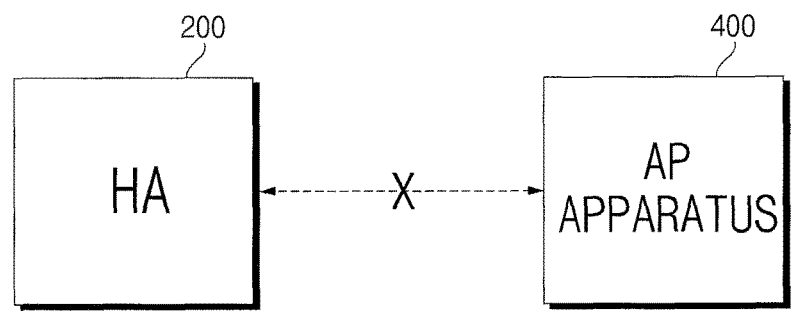
Figure 16B:
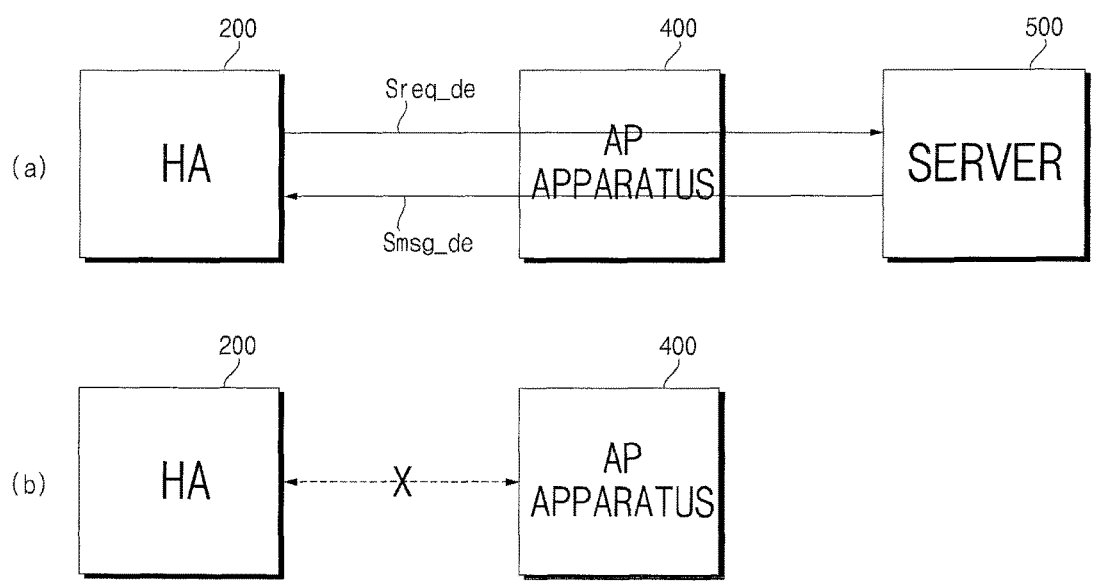

FIG. 14 is a flowchart illustrating a method for operating a home appliance according to another embodiment of the present invention, and FIGS. 15 to 16b are views referred to for describing the operating method of FIG. 14.

The home appliance 200 determines whether a first reset mode is set (S1105) and, if so, breaks the connection with the AP apparatus (S1110). Then, the network related information of the AP apparatus stored in the memory is deleted (S1115). Steps S1105 to S1115 correspond to steps S1205 to S1215 of FIG. 15, respectively.

For example, when the smart grid related indicator 630 is pressed for a time Ta (e.g., 5 seconds) in a state in which the home appliance 200 is connected to the AP apparatus 400 in step S725 or is connected to the server 500 in step S740, the home appliance 200 may be in a de-provisioned state as the first reset mode (local reset mode).

The controller 270 of the home appliance 200 controls the communication unit 222 to break the connection with the AP apparatus 400 in the first reset mode and controls deletion of the network related information received from the AP apparatus 400 and stored in the memory 240.

Thus, the communication unit 222 of the home appliance 200 may break the connection with the AP apparatus 400 in the first reset mode, as shown in FIG. 16a.

The network connection related indicator 610 and the smart grid related indicator 630 may both be turned off. The smart grid related indicator 630 may blink three times before being turned off.

Next, if the first reset mode is not set in step S1105, step S1120 may be performed.

That is, the home appliance 200 determines whether a second reset mode is set (S1120) and, if so, transmits a deletion request signal for product related information to the server (S1125). Then, the home appliance may receive a deletion completion message from the server (S1130). Steps S1120 to S1130 correspond to steps S1220 to S1230 of FIG. 15, respectively.

For example, if the smart grid related indicator 630 is pressed predetermined times (e.g., 5 times) for a time tb (e.g., 10 seconds) in a state in which the home appliance 200 is connected to the server 500 in step S740, the home appliance 200 may perform the second reset mode (factory reset mode).

In the second reset mode, the communication unit 222 of the home appliance 200 may transmit a deletion request signal Sreq_de to the server 500 and receive a deletion completion signal Smsg_de from the server 500, as shown in (a) of FIG. 16b.

Next, the home appliance 200 breaks the connection with the AP apparatus S1135. Then, the home appliance deletes the network related information of the AP apparatus stored in the memory (S1140). Steps S1135 to S1140 correspond to steps S1235 to S1240 of FIG. 15, respectively.

In the second reset mode, the controller 270 of the home appliance 200 controls the communication unit 222 to break the connection with the AP apparatus 400 and controls deletion of the network related information received from the AP apparatus 400 and stored in the memory 240, when the deletion completion message Smsg_de is received from the server 500.

The communication unit 222 of the home appliance 200 may break the connection with the AP apparatus 400 in the first reset mode, as shown in (b) of FIG. 16b.

Figure 17:
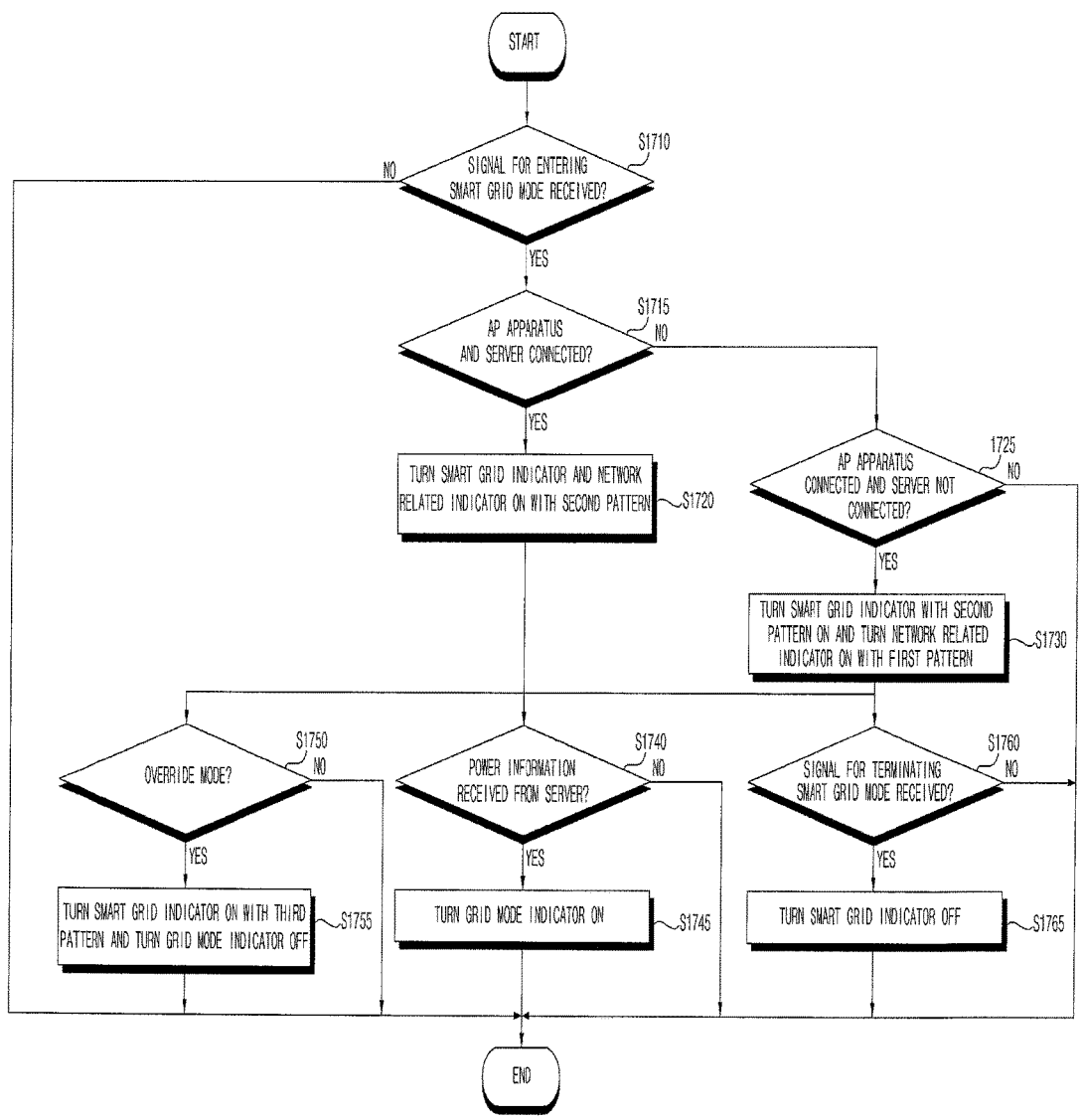
FIG. 17 is a flowchart illustrating a method for operating a home appliance according to another embodiment of the present invention.

FIG. 17 is a flowchart illustrating a method for operating a home appliance according to another embodiment of the present invention, and FIGS. 18a to 18d are views referred to for describing the operating method of FIG. 17.

The home appliance 200 determines whether a signal for entering the smart grid mode is received (S1710), determines whether the home appliance is connected to the AP apparatus 400 and the server 500 (S1715) if the signal is received, and turns the smart grid related indicator 630 and the network connection related indicator 610 on with the second pattern (S1720) if the home appliance is connected to the AP apparatus and the server.

When the home appliance 200 is powered on and connected to the AP apparatus 400 and the server 500, the smart grid related indicator 630 may be constantly turned on by default. That is, the home appliance may enter the smart grid mode. At this time, the network connection related indicator 610 may also be constantly turned on.

Figure 18A:
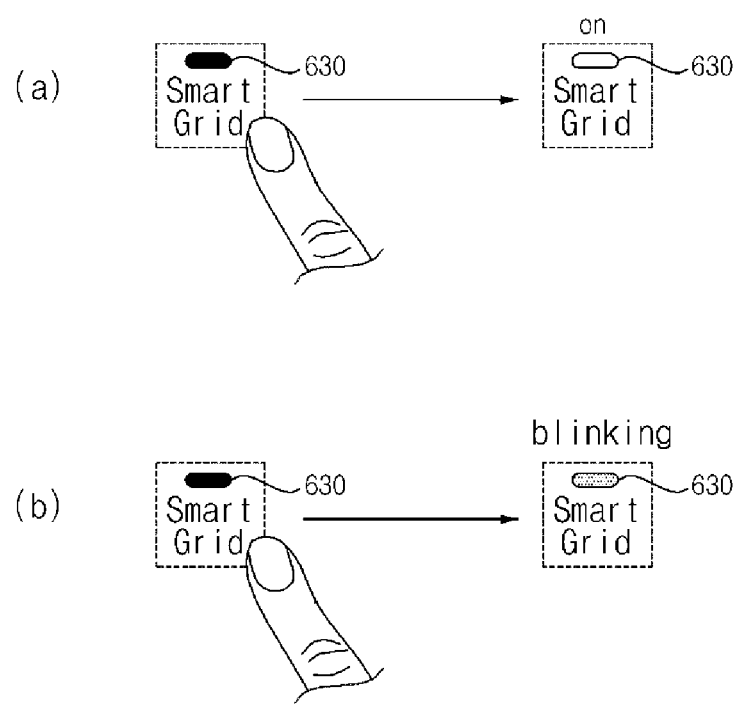
FIGS. 18a to 18d are views referred to for describing the operating method of FIG. 17.

As shown in (a) of FIG. 18a, when the user presses the smart grid related indicator 630 in a state in which the smart grid related indicator 630 of the home appliance 200 is turned off, the smart grid related indicator 630 may be constantly turned on if the home appliance 200 is connected to the AP apparatus 400 and the server 500. The home appliance may enter the smart grid mode.

If the home appliance is not connected to the AP apparatus and the server in step S1715, the home appliance 200 determines whether the home appliance is connected to the AP apparatus but is not connected to the server (S1725), and, if so, turns the smart grid related indicator 630 on with the second pattern and turns the network connection related indicator 610 on with the first pattern (S1730). That is, in step S725, the network connection related indicator 610 may blink and the smart grid related indicator 630 may be constantly turned on.

As shown in (b) of FIG. 18(a), when the user presses the smart grid related indicator 630 in a state in which the smart grid related indicator of the home appliance 200 is turned off, the network connection related indicator 610 may blink and the smart grid related indicator 630 may be constantly turned on if the home appliance 200 is connected to the AP apparatus 400 but is not connected to the server 500.

Next, after step S1720 or after step S1730, any one of step S1740, step S1750 or step S1760 may be performed.

First, in step S1740, the home appliance 200 determines whether power information is received from the server 500 (S1740) and, if so, turns the grid mode indicator on (S1745).

Figure 18B:
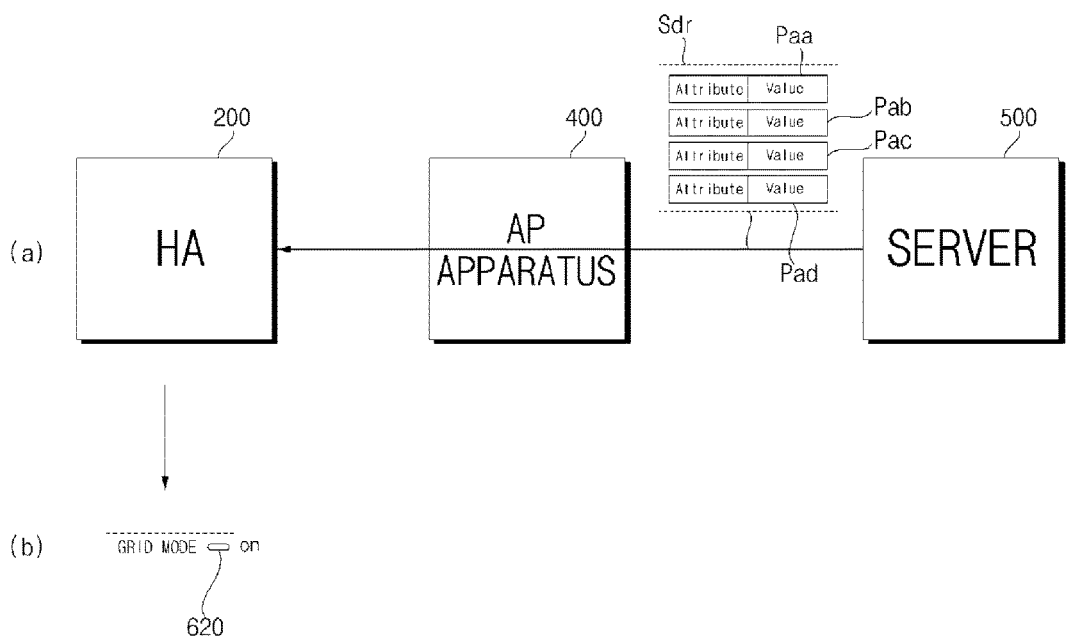

When the communication unit 222 of the home appliance 200 receives power information such as a dr signal from the server 500 in the smart grid mode as shown in FIG. (a) of FIG. 18b, the grid mode indicator 620 may be temporarily turned on as shown in (b) of FIG. 18b.

The power information received by the home appliance 200 includes a single data packet Sdr, the data packet Sdr may include set DR mode data as attribute data, and a value of the attribute data may include a duration hour, a duration minute, an offset hour and an offset minute.

The home appliance 200 may pause at a time corresponding to a DR period (e.g., a peak time) based on the received power information and re-operate after the peak time. That is, the home appliance 200 may operate in the smart grid mode.

For example, according to the smart grid mode, the compressor of the refrigerator may be temporarily turned off and rotation of the tub of the washing machine may pause.

The power information signal received by the communication unit 222 from the server 510 may be divided into first power information and second power information. The first power information may correspond to a signal for saving power by 13% and the second power information may correspond to a signal for saving power by 50%.

Upon operation of the home appliance and, more particularly, the driving unit 245, the controller 270 of the home appliance 200 may control the driving unit 245 to continuously operate when the first power information signal is received from the communication unit 222 and control the driving unit 245 to pause and re-operate when the second power information signal is received from the communication unit 222. That is, when the second power information signal requiring more power consumption reduction is received, the driving unit may pause, thereby reducing power consumption.

The controller 270 of the home appliance 200 may control the home appliance to operate in a power saving mode based on the first power information signal when the first power information signal or the second power information signal is received from the communication unit 222, upon non-operation of the driving unit 245.

In step S1750, the home appliance 200 determines whether an override mode is set (S1750) and, if so, turns the smart grid related indicator on with the second pattern and turns the grid mode indicator off (S1755).

Figure 18C:
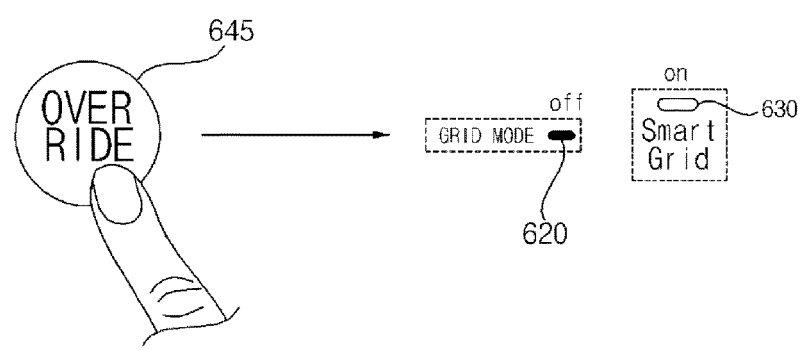

For example, as shown in FIG. 18c, when the override button 645 is pressed, the grid mode indicator 620 may be turned off and the smart grid related indicator 630 may be turned off with the second pattern.

Figure 18D:
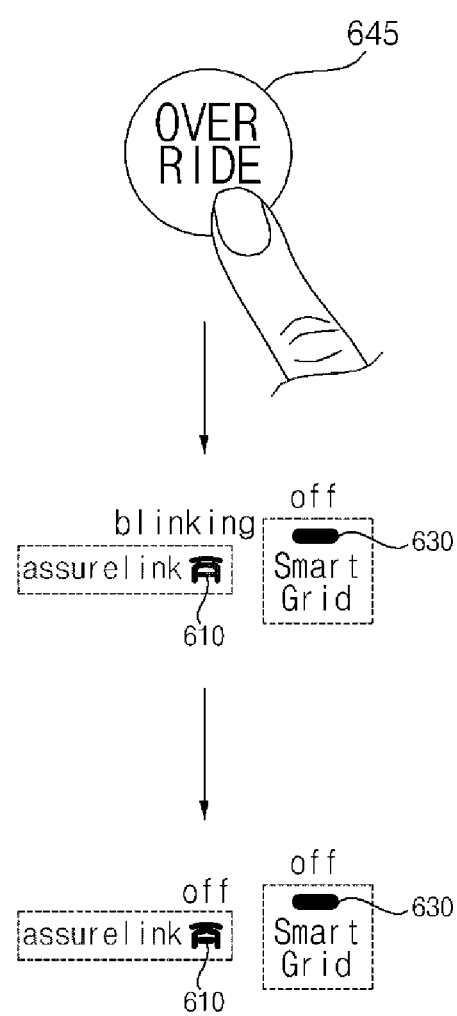

As another example, as shown in FIG. 18d, when the override button 645 is pressed, the network connection related indicator 610 may blink and the smart grid related indicator 630 may be turned on. Then, the network connection related indicator 610 and the smart grid related indicator 630 may both be turned off.

The override button 645 may be a grid button included in the display 230. Accordingly, when the grid button (not shown) is pressed in a state in which the grid mode indicator is turned on and the smart grid indicator is turned on, the override mode may be performed.

The override mode means that the home appliance 200 continuously operates without pause even at the time corresponding to the DR time (e.g., the peak time) even when the power information is received from the server 500.

For example, the compressor of the refrigerator may continuously operate without pause or the tub of the washing machine may continuously rotate without pause even at the peak time, according to the override mode which has priority higher than that of the smart grid mode.

In step S1760, the home appliance 200 determines whether a signal for terminating a smart grid mode is received from the server 500 (S1760) and, if so, turns the smart grid related indicator off (S1765).

The controller 270 of the home appliance 200 breaks the connection with the AP apparatus 400, when a signal for breaking a connection is received.

At this time, the controller 270 of the home appliance 200 may transmit a data packet corresponding to a power off event to the server 500 before breaking the connection with the AP apparatus 400. The transmitted data packet is a single packet and may include a plurality of attribute data such as a home appliance status, a remote control status and a control lock status and a value of the attribute data.

FIGS. 19a to 19d are diagrams showing various data packets transmittable between the home appliance and the server.

According to the embodiment of the present invention, the communication unit 222 of the home appliance 200 transmits or receives a single packet per event.

Figure 19A:
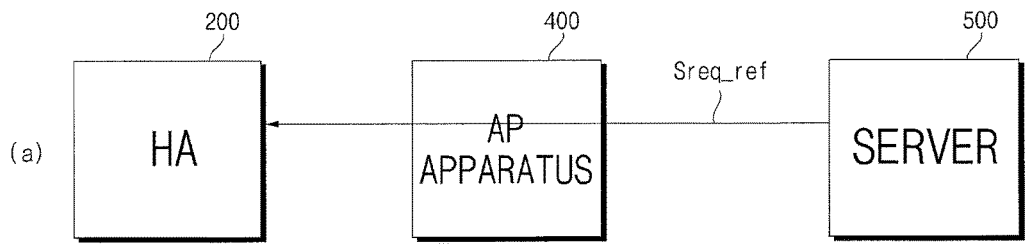
FIGS. 19a to 19d are diagrams showing various data packets transmittable between a home appliance and a server.
Figure 19A:
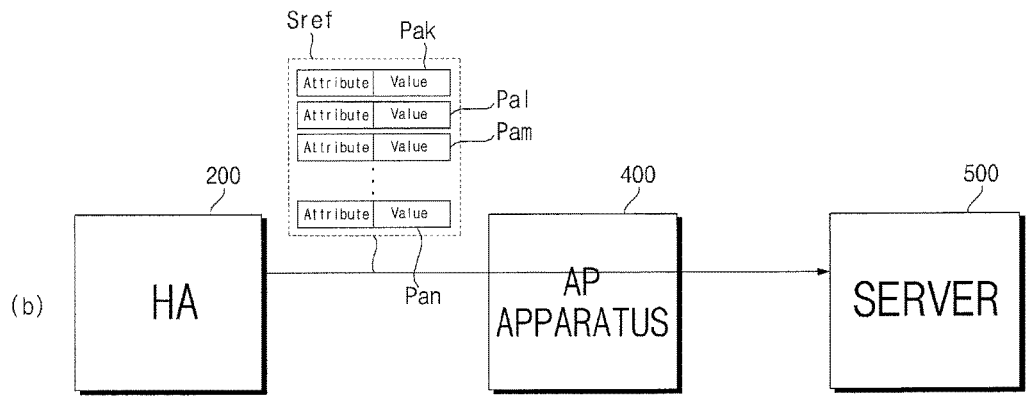
Figure 19B:
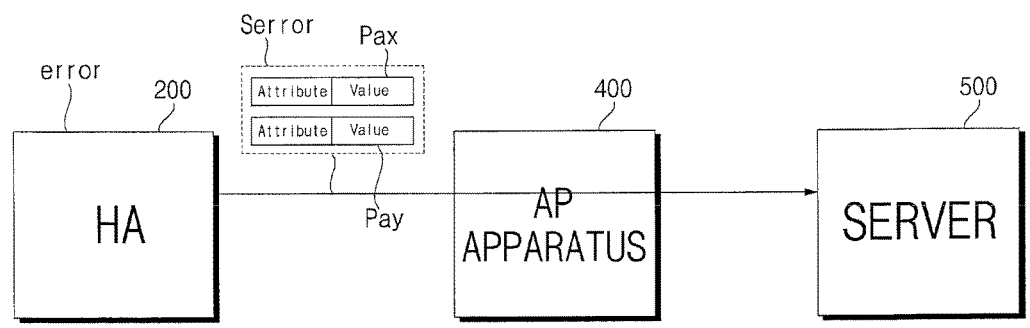

FIG. 19a shows the case in which the home appliance 200 receives refresh request data from the server 500 and FIG. 19b shows the case in which the home appliance 200 transmits a refresh data packet as a single packet in response thereto.

In particular, if the home appliance 200 is a drier or a washing machine, a refresh data event occurs. Therefore, a plurality of attribute data and values of the attribute data may be transmitted to the server 500 as a single packet.

The plurality of attribute data may include model number, software version and hardware number and may further include at least one of cycle name, remote control status, control lock status, home appliance status, cycle state, estimated time remaining, error code, odometer, dry level setting, drying time setting, static shield status, wrinkle guard status, steam option status, temperature setting, current DR mode, device DR compliance and device DR reason code.

If the home appliance 200 is a refrigerator, a refresh data event occurs. Therefore, a plurality of attribute data and values of the attribute data may be transmitted to the server 500 as a single packet.

The plurality of attribute data may include model number, software version and hardware number and may further include at least one of freezer temperature setting, refrigerator temperature setting, ice maker status, speed chill status, control lock status, ambient temperature, door status, water pressure, water filter status, air filter status, error code, current DR mode, device DR compliance and device DR reason code.

FIG. 19b shows transmission of an error related data packet Serror to the server 500 when an error code occurs in the home appliance 200.

When the error code occurs, an error fault event occurs. Thus, the error related data packet Serror may include a plurality of attribute data such as a home appliance status, a remote control status, an error code and error details, and values of the attribute data.

Figure 19C:
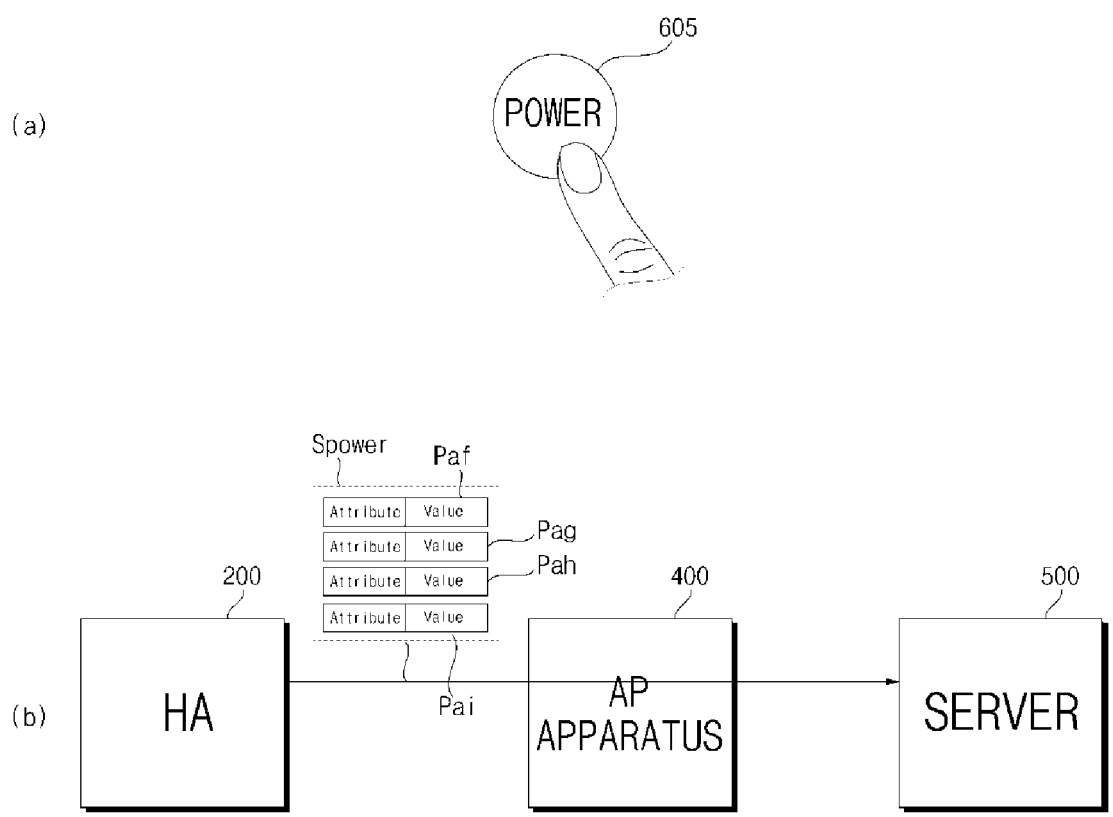

FIG. 19c shows the case in which, when the power button 605 of the home appliance 200 is pressed, a power on event occurs and a related data packet Spower is transmitted to the server.

The related data packet Spower may include a plurality of attribute data such as a home appliance status, a remote control status and a control lock status, and values of the attribute data.

Figure 19D:
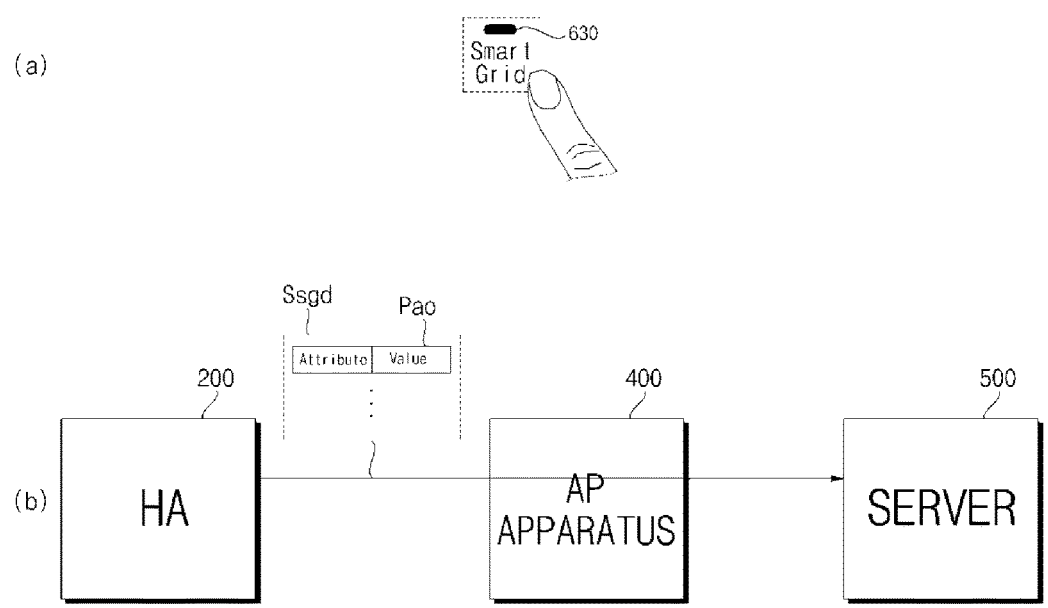

FIG. 19d shows the case in which, when the smart grid related indicator 630 in the off state is pressed, the communication unit 222 transmits a related data packet Ssgd to the server.

The related data packet Ssgd may include a plurality of attribute data such as a current DR mode and a current reason code, and values of the attribute data.

When a chime button is pressed for 5 seconds or a control lock on message is remotely received during a cycle in which the home appliance 200 operates, the control lock on event occurs. The attribute data such as the control lock status may be transmitted to the server.

When the chime button is pressed for 5 seconds one more, a control lock off event occurs. The attribute data such as the control lock status may be transmitted to the server.

The home appliance according to the foregoing embodiments is not restricted to the embodiments set forth herein. Therefore, variations and combinations of the exemplary embodiments set forth herein may fall within the scope of the present invention.

According to the embodiments of the present invention, the communication unit of the home appliance exchanges a single data packet including a plurality of attribute data and values of the attribute data with the server when a predetermined event occurs. Since the plurality of attribute data and the values of the attribute data are not transmitted via a plurality of data packets but are transmitted via the single data packet, the server 500 can confirm data per event. Accordingly, it is possible to easily data exchange with the server.

Based on reception of the power information from the server, a smart grid operation becomes possible and thus power consumption can be reduced.

Even in a smart grid mode, if an override mode is set, the home appliance operates in the override mode. Thus, the home appliance can continuously operate.

Indicators corresponding to various modes of the home appliance operate, thereby increasing user convenience.

For network setup, the home appliance transmits network setup related information to the AP apparatus, receives network related information from the AP apparatus, accesses the AP apparatus after receiving the network related information, and transmits product related information after accessing the AP apparatus, for product registration with the server. Thus, the home appliance can conveniently perform product registration with the server.

The home appliance stores the received network related information such that the network related information may be used upon re-accessing the AP apparatus.

A user may distinguishably and immediately recognize accessing of the AP apparatus and accessing of the server via a display.

The network related information is deleted in a first reset mode and the product related information of the product registered with the server and the network related information are deleted in a second reset mode, such that the home appliance performs product re-registration with the server.

The home appliance according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:
a motor;
a driver configured to drive the motor;
a display to display a network connection related indicator and a smart grid indicator,
    wherein the network connection related indicator functions as an input unit as well as the display that indicates whether the home appliance is connected to an access point apparatus or a server, and
    wherein the smart grid indicator functions as an input unit as well as the display that indicates that smart grid mode is possible;
a controller configured to control the driver;
a communication unit electrically connected to the controller, and including a first interface for data communication with the access point apparatus based on network related information, and a second interface for data communication with the server via the connected access point apparatus; and
a memory configured to store network related information received from the access point apparatus,
wherein in response to a predetermined event, the communication unit to provide, to the server, a single data packet that includes a plurality of attribute data and values of the attribute data,
wherein the communication unit receives power information from the server during accessing the access point apparatus,
wherein when the smart grid indicator is pressed for a period of first time in a state in which the home appliance is connected to the server and the home appliance is connected to the access point apparatus, the home appliance is set in a de-provisioned state in which a first reset mode is set,
wherein, in the first reset mode, the controller controls the communication unit to break a connection with the access point apparatus and controls deletion of the network related information received from the access point apparatus and stored in the memory,
wherein when the smart grid indicator is pressed predetermined times for a period of second time, which is longer than the period of first time, in the state in which the home appliance is connected to the server and the home appliance is connected to the access point apparatus, a second reset mode is set,
wherein, in the second reset mode, the communication unit transmits a deletion request signal to the server to delete the plurality of attribute data and values of the attribute data and receives a deletion completion message from the server, and then the controller controls the communication unit to break the connection with the access point apparatus and controls deletion of the network related information received from the access point apparatus and stored in the memory when the deletion completion message is received from the server.

2. The home appliance according to claim 1, wherein in response to an event to register a product, the communication unit to provide, to the server, a data packet that includes attribute data for a product identification (id), a device name, a device password or a domain name of the server and a value of the attribute data.

3. The home appliance according to claim 1, wherein in response to receiving a refresh data request from the server, the communication unit to provide, to the server, a data packet that includes attribute data for a model number, a software version or a hardware number and a value of the attribute data.

4. The home appliance according to claim 3, wherein the data packet includes attribute data for at least one of a control lock status and a current demand response (DR) mode and a value of the attribute data.

5. The home appliance according to claim 1, wherein while in a smart grid mode, the communication unit to provide, to the server, a data packet that includes attribute data for each of a plurality of pieces of information including a current demand response (DR) mode and a value of the attribute data.

6. The home appliance according to claim 5, wherein in response to a touch input at the smart grid indicator while the smart grid indicator is turned off, the communication unit to provide the data packet to the server.

7. The home appliance according to claim 1, wherein in response to occurrence of the event, the communication unit to provide, to the server, a data packet that includes attribute data for a home appliance status or an error code and a value of the attribute data.

8. The home appliance according to claim 1, wherein in response to power being turned on or off, the communication unit to provide, to the server, a data packet that includes attribute data for a home appliance status or a control lock status and a value of the attribute data.

9. The home appliance according to claim 1, wherein in response to receiving power information from the server, the communication unit to receive a data packet that includes attribute data for a set demand response (DR) mode and a value corresponding to duration hours or offset hours of the set DR mode.

10. The home appliance according to claim 9, wherein in response to receiving power information, the controller to control the home appliance to operate in a smart grid mode, and when an override mode is set at the home appliance, the controller to control the home appliance to operate in an override mode prior to the home appliance operating in the smart grid mode.

11. The home appliance according to claim 1, wherein the power information includes set demand response (DR) mode data as an attribute data, and a value of the attribute data, and
wherein the controller is configured to pause the driver at a time corresponding to a peak time in the DR mode data and to re-operate the driver after the peak time.

12. An appliance comprising:
a driver configured to drive a component of the appliance;
a controller configured to control the driver;
a display to display a network connection related indicator and a smart grid indicator,
wherein the network connection related indicator functions as an input unit as well as a display that indicates whether the appliance is connected to an access point apparatus or a server, and
wherein the smart grid indicator functions as an input unit as well as a display that indicates that smart grid mode is possible;
a communication unit electrically connected to the controller and including a first interface for data communication with the access point apparatus based on network related information, and a second interface for data communication with the server, the communication unit to connect the appliance to the server via the connected access point apparatus; and
a memory configured to store network related information received from the access point apparatus,
wherein in response to an event at the appliance, the communication unit to provide, to the server, a data packet that includes a plurality of attribute data and values of the attribute data,
wherein the communication unit receives power information from the server during accessing the access point apparatus,
wherein when the smart grid indicator is pressed for a period of first time in a state in which the appliance is connected to the server and the appliance is connected to the access point apparatus, the appliance is set in a de-provisioned state in which a first reset mode is set,
wherein, in the first reset mode, the controller controls the communication unit to break a connection with the access point apparatus and controls deletion of the network related information received from the access point apparatus and stored in the memory,
wherein when the smart grid indicator is pressed predetermined times for a period of second time, which is longer than the period of first time, in the state in which the appliance is connected to the server and the appliance is connected to the access point apparatus, a second reset mode is set,
wherein, in the second reset mode, the communication unit transmits a deletion request signal to the server to delete the plurality of attribute data and values of the attribute data and receives a deletion completion message from the server, and then the controller controls the communication unit to break the connection with the access point apparatus and controls deletion of the network related information received from the access point apparatus and stored in the memory when the deletion completion message is received from the server.

13. The appliance according to claim 12, wherein the data packet is a single data packet.

14. The appliance according to claim 12, wherein in response to registering a product, the communication unit to provide, to the server, a data packet that includes attribute data and a value of the attribute data, the attribute data relating to a product identification (id), a device name, a device password or a domain name of the server.

15. The appliance according to claim 12, wherein in response to a refresh data request, the communication unit to provide, to the server, a data packet that includes attribute data and a value of the attribute data, the attribute data relating to a model number, a software version or a hardware number.

16. The appliance according to claim 15, wherein the attribute data relates to at least one of a control lock status and a current demand response (DR) mode.

17. The appliance according to claim 12, wherein while in a smart grid mode, the communication unit to provide, to the server, a data packet that includes attribute data and a value of the attribute data, the attribute data relating to each of a plurality of pieces of information including a current demand response (DR) mode.

18. The appliance according to claim 12, wherein in response to the event, the communication unit to provide, to the server, a data packet that includes attribute data and a value of the attribute data, the attribute data relating to a home appliance status or an error code.

19. The appliance according to claim 12, wherein in response to power being turned on or off, the communication unit to provide, to the server, a data packet that includes attribute data for a home appliance status or a control lock status and a value of the attribute data.

20. The appliance according to claim 12, wherein in response to receiving power information, the communication unit to receive a data packet that includes attribute data for a set demand response (DR) mode and a value corresponding to duration hours or offset hours of the set DR mode.

* * * * *